United States Patent [19]

May, Jr.

[11] Patent Number: 5,020,054

[45] Date of Patent: May 28, 1991

[54] PACKET FORMAT INCLUDING UNIQUE NETWORK IDENTITY

[76] Inventor: Carl J. May, Jr., 15 Donner St., Holmdel, N.J. 07733

[21] Appl. No.: 371,229

[22] Filed: Jun. 23, 1989

[51] Int. Cl.$^5$ .............................................. H04J 3/00
[52] U.S. Cl. ..................................... 370/94.1; 370/60; 370/85.1
[58] Field of Search .................... 370/60, 85, 94, 60.1, 370/85.1, 94.1, 82; 371/36, 49, 53

[56] References Cited

U.S. PATENT DOCUMENTS

| | | | |
|---|---|---|---|
| 4,063,220 | 12/1977 | Metcalfe et al. | 370/85 |
| 4,516,239 | 5/1985 | Maxemchuk | 370/85 |
| 4,550,397 | 10/1985 | Turner et al. | 370/60 |
| 4,644,533 | 2/1987 | Braff et al. | 370/94 |
| 4,679,189 | 7/1987 | Olson et al. | 370/60 |
| 4,679,190 | 7/1987 | Dias et al. | 370/60 |
| 4,704,606 | 11/1987 | Hasley | 340/825.5 |
| 4,712,214 | 12/1987 | Meltzer et al. | 371/32 |
| 4,754,451 | 6/1988 | Eng et al. | 370/60 |
| 4,764,920 | 8/1988 | Furuya | 370/94 |

OTHER PUBLICATIONS

I. Cidon et al., "Paris: An Approach to Integrated High-Speed Private Networks", International Journal of Digital and Analog Cabled Systems, vol. 1, No. 2, pp. 77-85, Apr.-Jun. 1988.
J. A. McDermid, "Design and Use of Comflex-A Hardware-Controlled Packet Switch", IEE Proceedings, vol. 127, Pt.E., No. 6, pp. 233-240, Nov. 1980.
W. Stallings, "Data and Computer Communications", 2nd edition, Macmillian Publishing Co., 1988, pp. 104-107.

Primary Examiner—Douglas W. Olms
Assistant Examiner—Christopher O. Edwards

[57] ABSTRACT

A unique packet transport word, i.e., header, format is employed which eliminates the possiblity of particular packet transport words being mistaken for other transport words used in a private network, public network or otherwise. This is realized by employing a unique network reference code word to compute one or more prescribed parity checks over bits in predetermined bit positions of the transport word. The network reference code word is used to specify the sense, i.e., odd or even, of predetermined ones of the parity check bits being computed which form the one or more prescribed parity checks. Individual ones of such network reference code words are assignable to specific private transport users and, thereby, provide transparency of their transport words in the public or other networks. Additionally, unique network reference code words are assigned to each network layer in a system hierarchy to identify each of the specific network layers and to provide transparency of the lower network layer transport words in the higher network layers.

25 Claims, 15 Drawing Sheets

FIG. 4

| | BYTE(7) | BYTE(6) | BYTE(5) | BYTE(4) | BYTE(3) | BYTE(2) | BYTE(1) | (Xref alt.) | BYTE(0) | (Xref alt.) |
|---|---|---|---|---|---|---|---|---|---|---|
| BIT(7) | PBIT(7) | SGZ | SIZE(7) | TYPE(4) | VCID(7) | VCID(8) | DEST(11) | Xref(11) | DEST(7) | Xref(7) |
| BIT(6) | PBIT(6) | EXC | SIZE(6) | TYPE(3) | VCID(6) | VCID(9) | DEST(10) | Xref(10) | DEST(6) | Xref(6) |
| BIT(5) | PBIT(5) | PBYT(5) | SIZE(5) | TYPE(2) | VCID(5) | VCID(10) | DEST(9) | Xref(9) | DEST(5) | Xref(5) |
| BIT(4) | PBIT(4) | PBYT(4) | SIZE(4) | TYPE(1) | VCID(4) | VCID(11) | DEST(8) | Xref(8) | DEST(4) | Xref(4) |
| BIT(3) | PBIT(3) | PBYT(3) | SIZE(3) | TYPE(0) | VCID(3) | VCID(12) | VCID(19) | | DEST(3) | Xref(3) |
| BIT(2) | PBIT(2) | PBYT(2) | SIZE(2) | BKG(2) | VCID(2) | VCID(13) | VCID(18) | | DEST(2) | Xref(2) |
| BIT(1) | PBIT(1) | PBYT(1) | SIZE(1) | BKG(1) | VCID(1) | VCID(14) | VCID(17) | | DEST(1) | Xref(1) |
| BIT(0) | PBIT(0) | PBYT(0) | SIZE(0) | BKG(0) | VCID(0) | VCID(15) | VCID(16) | | DEST(0) | Xref(0) |

PACKET FORMAT INCLUDING UNIQUE NETWORK IDENTITY

CROSS-REFERENCE TO RELATED APPLICATIONS

U.S. patent applications Ser. Nos. 371,236 371,235; 371,233; 371,232; 371,237; and 371,570 were filed concurrently herewith.

TECHNICAL FIELD

This invention relates to packet transmission systems and/or switching systems and, more particularly, to a packet format.

BACKGROUND OF THE INVENTION

In packet transmission systems and/or switching systems, it is important to delimit packets, i.e., identify the beginning and end of the packets. Packets were delimited in prior arrangements by employing flags, i.e., a specific code word, placed at the beginning and end of the packet and by employing bit stuffing so that data being transmitted did not emulate the flags.

Such prior delimiting arrangements require bit-by-bit processing. Consequently, they are difficult, if at all possible, to implement for high bit rate packet transmission systems, e.g., bit rates of 45 Mbits/sec or higher. Indeed, any possible implementation of such a prior delimiting arrangement would be expensive and, therefore, undesirable from an economic standpoint.

More recently, packets have been delimited by employing a unique packet transport word, i.e., header, including one or more prescribed parity checks in conjunction with a packet length, i.e., size, indicator, as described in my U.S. patent application Ser. No. 371,236 filed concurrently herewith. In such a packet transport word arrangement, it is possible that the user information may emulate a possible packet transport word. The probability of user information emulating a public network packet transport word is made extremely low by employing a relatively "large" number of check bits in the parity checks.

However, if a particular transport user employs transport words in a private or other network which are similar to those used in the public network, it is possible that such private network transport words will be mistaken for those used in the public network. Such occurrences are extremely undesirable and must be avoided. Otherwise, errors in transmission and/or switching will occur. That is to say, packets would be lost or, worse, miss-delivered.

SUMMARY OF THE INVENTION

Problems associated with particular packet transport words, i.e., headers, being mistaken for other transport words used in a private network, public network or otherwise, are minimized, in accordance with an aspect of the invention, by employing a unique network reference code word in computing one or more prescribed parity checks used in the transport word. The use of the unique network reference code word eliminates the possibility of transport words used in a particular network being mistaken for similar type transport words that are used in another network whether private, public or other.

Specifically, the unique network reference code word specifies the sense, i.e., odd or even, of predetermined ones of parities being computed for the one or more prescribed parity checks, and is unique to at least a predetermined network configuration.

Additionally, a unique network reference code word can be assigned to a specific private network user and thereby provide the private network with all the advantages accompanying its use and, in particular, transport transparency in other similar networks being interfaced by the private network.

In accordance with another aspect of the invention, unique network reference code words are assigned to each network layer in a particular system hierarchy. Consequently, packets generated, in accordance with the invention, for a lower network layer of the hierarchy are transparent at higher network layers. The transparency is realized by adding a transport word to the lower network layer packet that includes one or more prescribed parity checks that include predetermined parities which have been generated in accordance with the network reference code word assigned to the specific network layer in the hierarchy. Indeed, a packet at a higher network layer in the hierarchy may include a number of lower network layer packet transport words in its information words. The addition of the transport word having the one or more prescribed parity checks including predetermined parities which have been generated with the unique network reference code word is replicated for as many network layers as there are in the particular system.

This technique is advantageously employed to provide private or other transport users all the advantages accompanying the use of such a unique transport word. A specific advantage of employing this aspect of the invention in private or other networks having portions thereof at diverse geographic locations, is that the diverse private network portions appear to the private transport user as a single "contiguous" private network.

BRIEF DESCRIPTION OF THE DRAWING

In the drawing:

FIG. 4 depicts a packet transport word including aspects of the invention;

DETAILED DESCRIPTION

Figure 1:
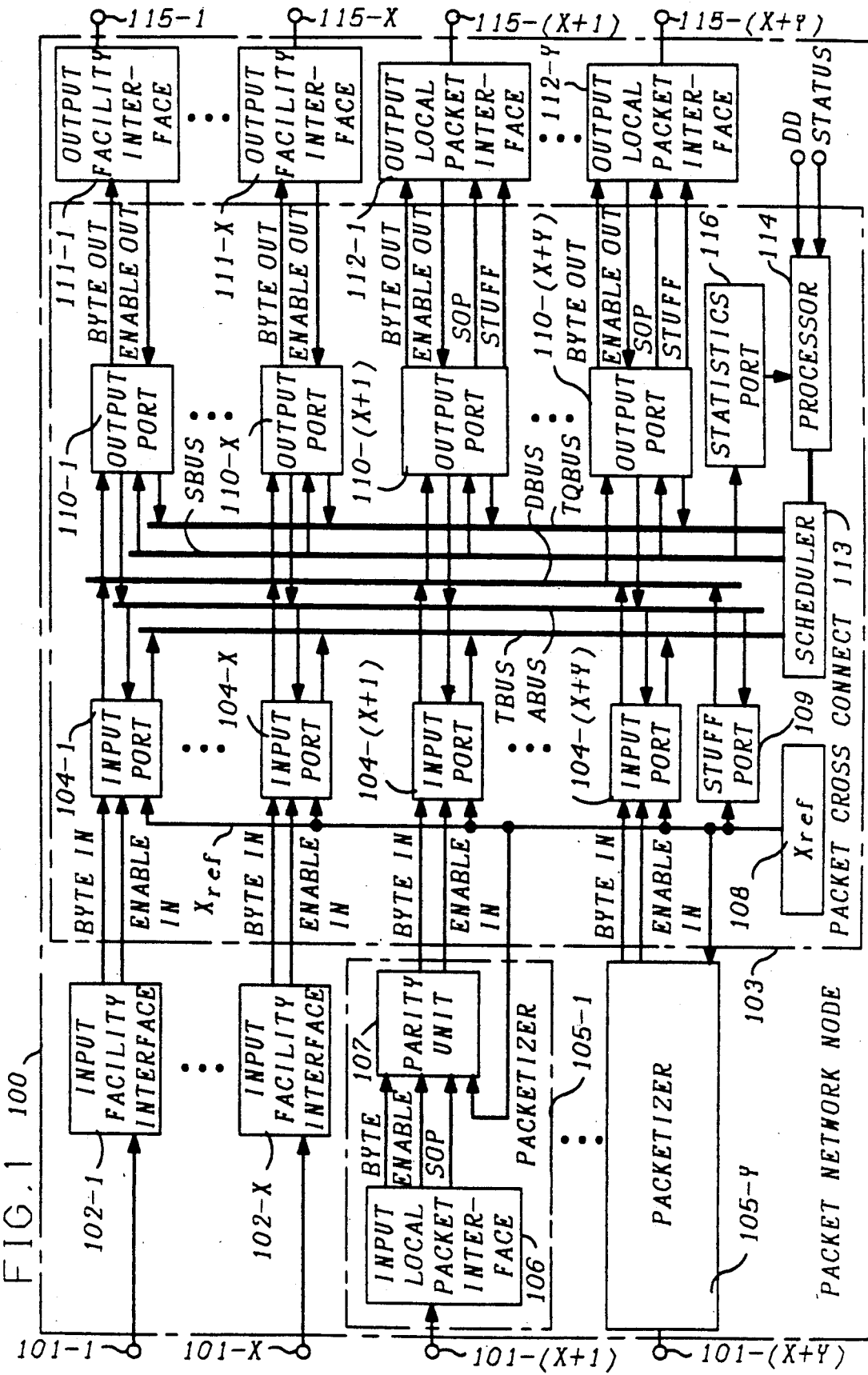
FIG. 1 shows details, in simplified block diagram form of a packet network node including aspects of the invention.
Figure 16:
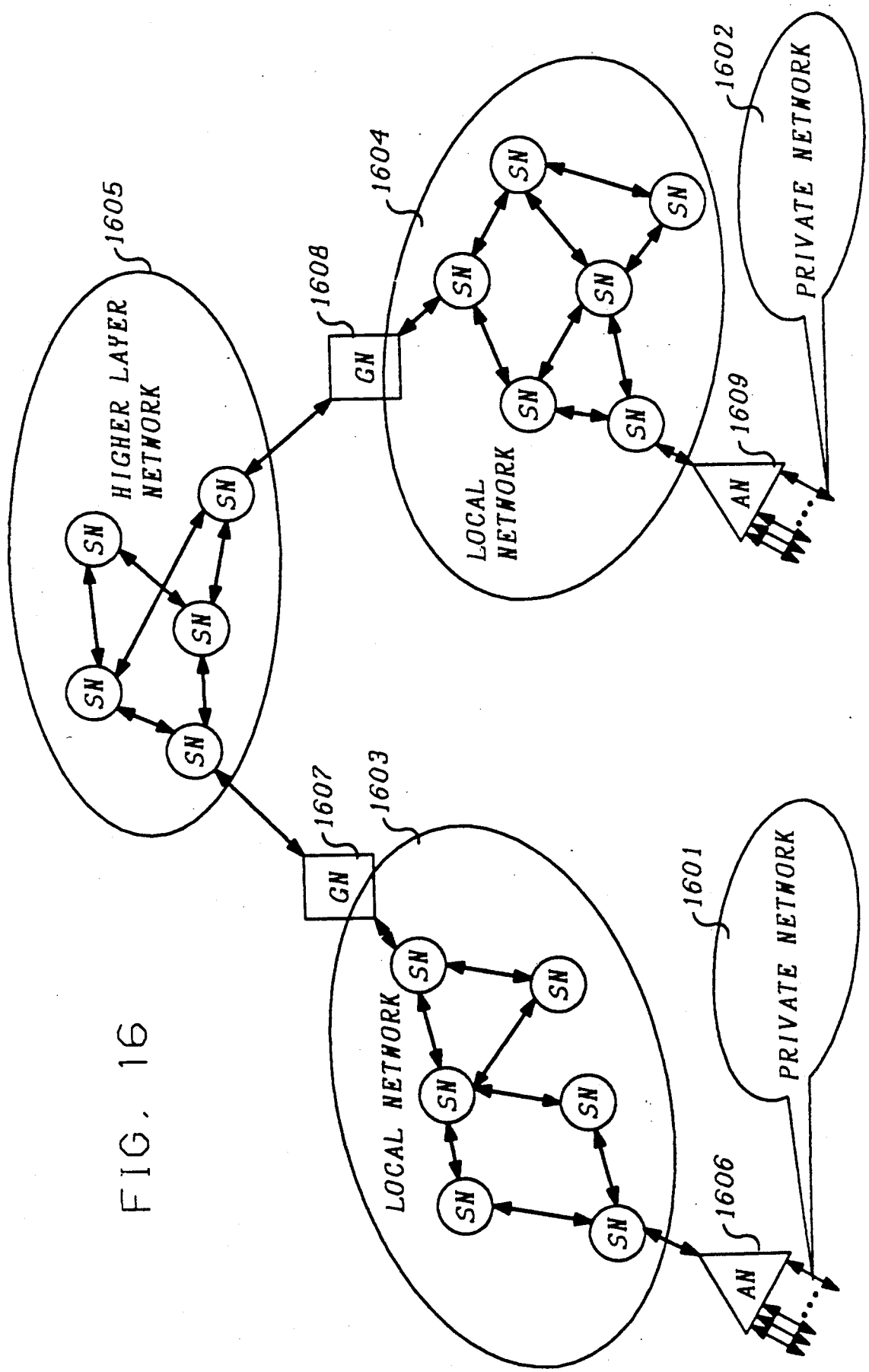
FIG. 16 shows a packet network arrangement in which packet network node 100 including aspects of the inventions may be advantageously employed.

FIG. 1 shows details, in simplified block diagram form, of packet network node 100 for interconnecting a plurality of incoming ports to a plurality of outgoing ports. Such packet network nodes may be advantageously employed in a network as shown in FIG. 16 and described below. Accordingly, signals from a plurality of sources are supplied via terminals 101-1 through 101-(X+Y) to packet network node 100. The sources may be, for example, broadband packet transmission facilities, digital data, RS232, DSO, DS1, DS3, other digital signals, other packet signals, e.g., LAPD (Link Access Protocol D channel), broadband packets of a type similar to those disclosed herein or the like. These signals may be analog or digital at any desired rate. For example, the incoming signal bit rates could be the 64 Kbit/sec DSO rate, the 1.544 Mb/sec DS1 rate, or a 150 Mb/sec transmission rate including packet formatted information, or any higher or lower rate, as desired.

If the incoming signal is being transmitted over a digital facility and includes packets in a broadband packet format of a type employed in packet network node 100, it would be supplied to one of facility interfaces 102-1 through 102-X. Input facility interfaces 102, in this example, are employed to supply the packet information a byte at a time to packet cross-connect 103 and, therein, to a corresponding one of input ports 104-1 through 104-X. Such facility interfaces are known in the art and, typically, include a phase locked loop for recovering the incoming clock signal, a framer, a bipolar-to-unipolar converter if needed, an equalizer for the equalization of gain and/or delay distortion, performance monitoring apparatus and apparatus for reformatting the incoming digital signal from the incoming digital format into the broadband packet format used in cross-connect 103 which is supplied to a corresponding one of input ports 104-1 through 104-X a byte at a time.

In this example, packet network node 100 also includes packetizers 105-1 through 105-Y. Each of packetizers 105-1 through 105-Y include an input local packet interface 106 and a parity unit 107. Operation of an exemplary one of packetizers 105 in generating a packet transport word, i.e., header, and a packet format, in accordance with aspects of the invention, is described below. It should be noted, however, that depending on the type of signal source being interfaced the structure of the particular one of packetizers 105 may vary. However, the broadband packet format being generated is the same for all of packetizers 105. Such packetizers may also be included in other remotely located equipments which supply signals to a packet network node 100 via a transmission facility and a corresponding input facility interface 102 or if desired directly to one of packetizers 105-1 through 105-Y for reasons described below. It is noted that one of packetizers 105-1 through 105-Y is designated a control input.

The broadband packet formatted incoming signals are supplied from packetizers 105-1 through 105-Y to input ports 104-(X+1) through 104-(X+Y), respectively. A reference code word Xref is supplied from Xref unit 108 to each of packetizers 105-1 through 105-Y, to each of input ports 104-1 through 104-(X+Y) and to stuff port 109. Xref unit 108 may include a register or other memory device for storing a desired reference code word. The reference code word Xref is unique to each network layer in the system hierarchy and provides so-called transmission transparency for all users. Additionally, private networks employing the same broadband packet format are each assigned a unique reference code word Xref which is used to delimit the private network packets and also provides transparency in the system hierarchy.

Figure 5:
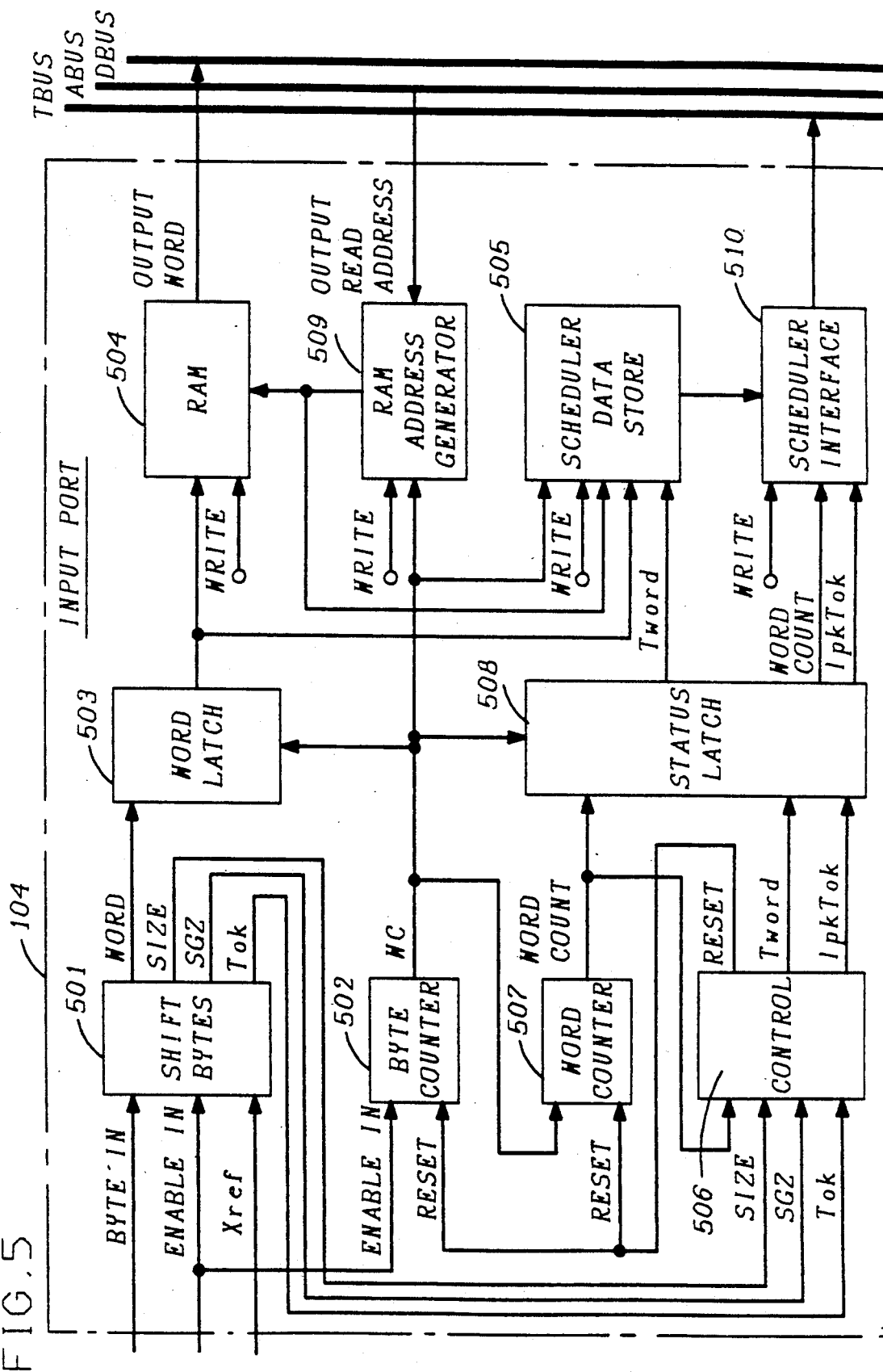
FIG. 5 shows details, in simplified block diagram form, of input ports 104 employed in the packet cross-connect 103 of FIG. 1.

Each of input ports 104-1 through 104-(X+Y) is employed to delimit packets, to synchronize to the incoming broadband packet format and to store the packets which are to be obtained by appropriate ones of output ports 110-1 through 110-(X+Y), in accordance with aspects of the invention. To this end, each of input ports 104 interfaces on a synchronous basis with packet cross-connect 103 data bus (DBUS), address bus (ABUS) and transport bus (TBUS). These buses operate on a time division multiplexed basis. Details of each of input ports 104 are shown in FIG. 5 and are described below.

Stuff port 109 generates so-called stuff packets which are transmitted when no other packets are present for transmission. Stuff port 109 generates the stuff packets in a manner substantially identical to that employed in packetizers 105 and described below. The stuff packets are stored in a buffer memory for use as needed. Stuff packets are requested as needed by individual ones of output ports 110-1 through 110-(X+Y), as explained below. To this end, stuff port 109 interfaces with the packet cross-connect 103 address bus (ABUS) and data bus (DBUS).

Each of output ports 110-1 through 110-(X+Y) is employed to supply packets obtained from input ports 104-1 through 104-(X+Y) and stuff port 109 to an appropriate one of output interfaces 111-1 through 111-X and output local packet interfaces 112-1 through 112-Y. For example, if the packets are to be transmitted to a remote packet network node they will be supplied to one of output facility interfaces 111-1 through 111-X and, in turn, to output terminals 115-1 through 115-X, respectively. If the destination of a packet is the instant packet network node 100, it will be supplied to an appropriate one of output local packet interfaces 112-1 through 112-Y and, in turn, to output terminals 115-(X+1) through 115-(X+Y), respectively. As in the case of packetizers 105, output local packet interfaces 112 may also require different structures depending on the type of equipment that is being interfaced.

Output facility interfaces 111-1 through 111-X typically include apparatus for interfacing output ports 110-1 through 110-X, respectively, to predetermined transmission facilities. To this end, each of output facility interfaces 111 include appropriate apparatus for formatting the broadband packets being transmitted into the particular signal format of the corresponding transmission facility. Such output facility interfaces will be apparent to those skilled in the art.

Figure 7:
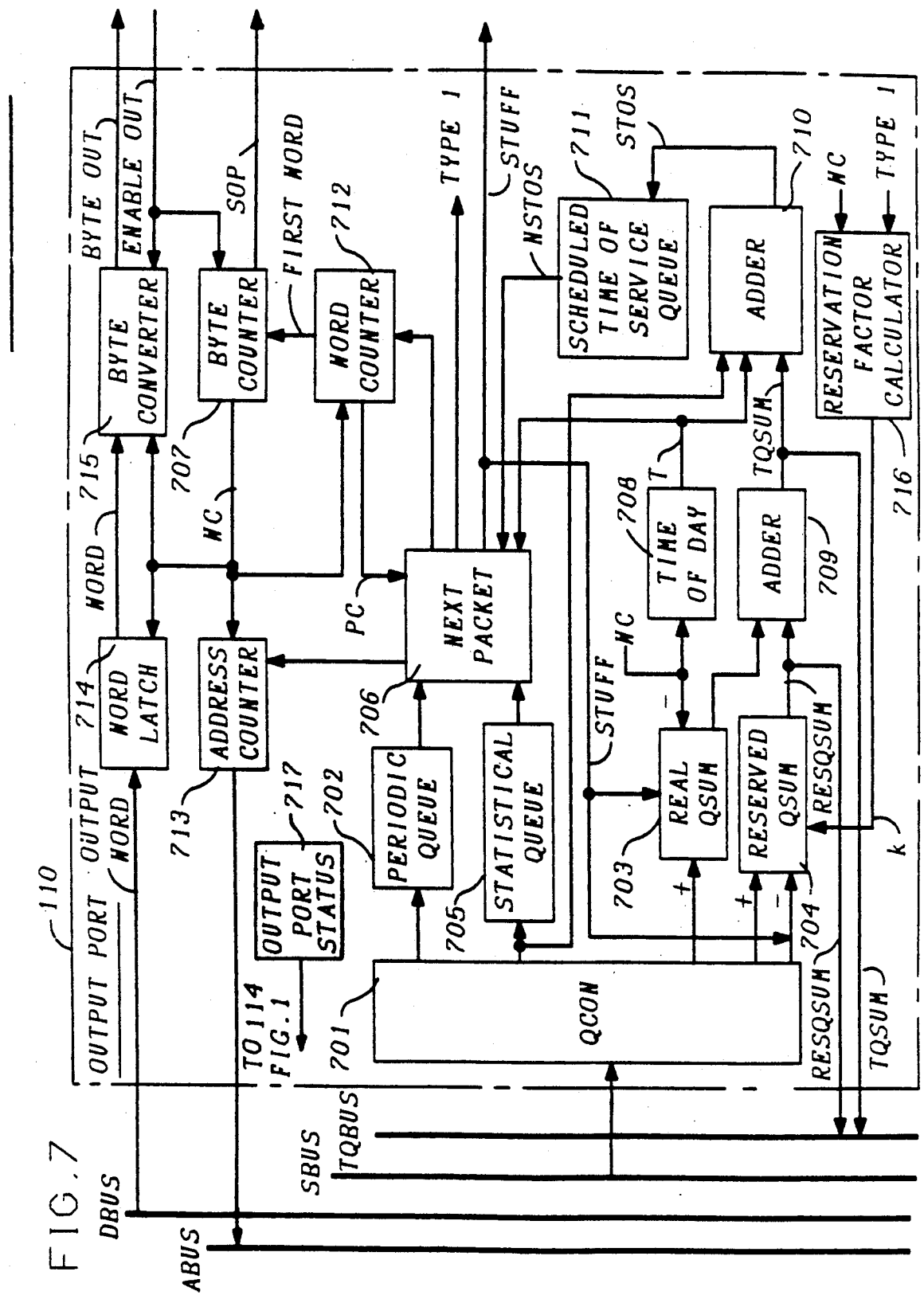
FIG. 7 shows details, in simplified block diagram form, of output ports 110 employed in packet cross-connect 103 of FIG. 1.

To this end, each of output ports 110-1 through 110-(X+Y), in conjunction with scheduler 113, operates to schedule the transmission of the packets, in accordance with aspects of the invention. In order to realize these functions, each of output ports 110 interfaces on a synchronous basis with the packet cross-connect 103 data bus (DBUS), address bus (ABUS), scheduler bus (SBUS) and total quanta bus (TQBUS). Again, each of the cross-connect buses operates on a time division multiplexed basis. Details of each of output ports 110 are shown in FIG. 7 and are described below.

Scheduler 113, in conjunction with processor 114, operates to control the routing of packets from input ports 104 to output ports 110 and to statistics port 116 and to control output scheduling of the packets at output ports 110 in accordance with aspects of the invention.

Processor 114 is supplied with information regarding the status of output ports 110 and with delay difference (DD) values between primary and alternate routes assigned to the destination (DEST) for the particular packet being scheduled for transmission. Additionally, statistics port 116 supplies information to processor 114 regarding the status of input ports 104. In turn, processor 114 supplies this information to scheduler 113.

Operation of packet network node 100 and, therein, packet cross-connect 103 will become apparent to those skilled in the art from the following detailed description of the components thereof. It is noted, that the inputs to input ports 104 and the outputs from output ports 110 are asynchronous. However, the internal interfacing with input ports 104 within packet cross-connect 103 is synchronous at a clock rate which is determined as a function of the number $X+Y=N$ of input ports and the maximum transmission rate of the signals being supplied to packet network node 100. In this example, a particular time slot of cross-connect 103 timing sequence i.e., polling cycle, is employed to write certain information in input ports 104, as will be explained below. A polling cycle is completed in an interval less than a packet word interval at the maximum incoming transmission rate. Thus, in this example, if the maximum incoming transmission rate is, for example, 150 Mb/sec, there are $N=8$ ports and the word length is eight bytes, there will be $8+1=9$ time slots per polling cycle and the synchronous clock rate in packet cross-connect 103 is approximately 24 Mb/sec. Each of input ports 104-1 through 104-$(X+Y)$ is identified by a time slot number in the synchronous polling cycle of scheduler 113. Specifically, the first time slot through the Nth time slot identify input ports 104-1 through 104-$(X+Y)$, respectively, to scheduler 113. During time slots $N=X+Y$, output ports 110-1 through 110-$(X+Y)$ have access to the memory units in input ports 104 and time slot $N+1=0$ is the time slot for writing input word data into units in input ports 104.

Packet network node 100 may be employed in a number of applications, for example, as a switching node, an access node or a so-called gateway node. However, it is important to note that the configuration of cross-connect 103 is independent of the network configuration it is employed in, whether the network configuration is a ring, star, mesh or the like. A switching node would typically include a plurality of $N=X-1$ input and $N=X-1$ output facility interfaces 102 and 111, respectively, and at least one packetizer 105 and a corresponding output local packet interface 112. An access or gateway node would typically include $Y=N-X$ input ports and $Y=N-X$ output ports and at least one input facility interface 102 and at least one corresponding output facility interface 111, i.e., $X=1$ and, preferably, includes $Y=N-1$ packetizers 105 and $Y=N-1$ output local packet interfaces 112. For other applications, packet network node 100 may include a number of input and output facility interfaces (X) and a number of packetizers and output local packet interfaces (Y), where $X=Y$. However, any number of input facility interfaces and output facility interfaces, and packetizers and output local packet interfaces may be employed to meet system requirements in particular applications. It should be noted, however, for each type input interface there is a corresponding output interface. For example, if a digital signal is being received at this packet network node from a specific remote switching node via one of input facility interfaces 102, a similar digital signal is being transmitted to the remote switching node via a corresponding one of output facility interfaces 111. Similarly, if a data signal is being received from a local area network at one of packetizers 105, a similar data signal is being supplied to the local area network by one of output local packet interfaces 112. That is to say, there is two-way communication between sources of signals being supplied to packet network node 100.

PACKETIZER

Figures 2, 3:
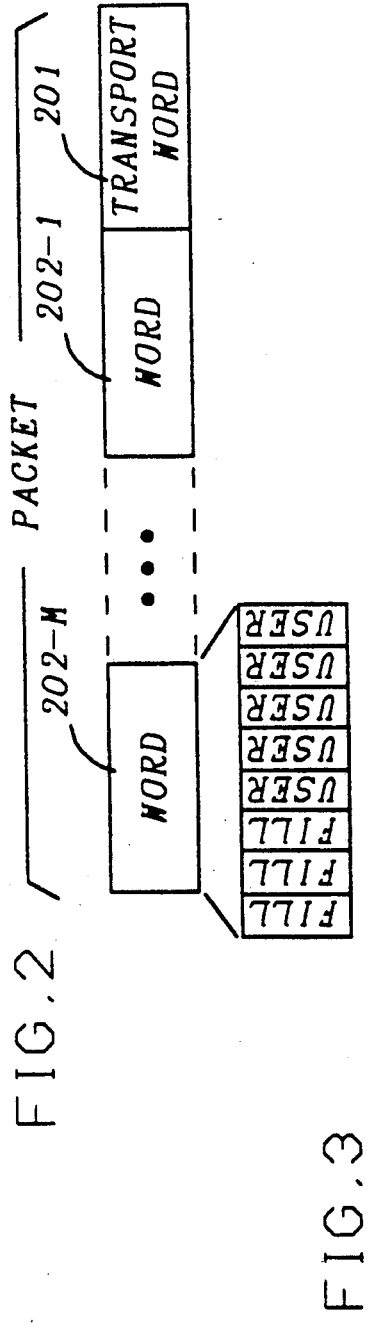
FIG. 2 depicts a packet format, illustrating an aspect of the invention.
FIG. 3 graphically illustrates a packet transport word, i.e., header, useful in describing an aspect of the invention.

As indicated above, each of packetizers 105-1 through 105-Y includes input local packet interface 106 and parity unit 107, and is employed to generate a packet format, in accordance with aspects of the invention, as shown in FIG. 2. To this end, input local packet interface 106 includes apparatus for interfacing the particular incoming signal in order to delimit it so that the broadband packet words may be formatted in accordance with the instant invention. Additionally, buffer storage is required for the packet being formatted, a transport word generator, counters for counting the number of packet bytes and the number of packet words, apparatus for padding the last packet information word to build it out to the proper number of bytes and multiplex apparatus for combining packet information words and the transport word to form the desired packet. The transport word generator can be a register or a read write (RAM) memory unit into which the desired information is inserted. Such apparatus is known in the art.

Accordingly, shown in FIG. 2 is a packet format including transport word (header) 201 and a number of information quanta, i.e., information words 202-1 through 202-M. Details of the transport word are described below in conjunction with FIGS. 3 and 4. The instant packet format including a number M of information words 202, each having a relatively short fixed length, is particularly advantageous toward efficient packet transmission and/or switching. Prior arrangements used either totally variable length information fields delimited by flags, or a fixed length information field. The arrangements using totally variable length information fields are undesirable because they use so-called bit level processing, and the arrangements using fixed length information fields are undesirable because the length of the information field is either too long or too short. Use of a fixed length information field also requires that the entire information field be transmitted or switched even when only one byte of information is present. In the instant arrangement, only a number M of the relatively short information words are transmitted or switched as determined by the number of bytes of information to be included in the packet. Then, only the last information word in the packet may have to be padded to include bytes not used for information in order to build out the last word to its proper length. As shown in FIG. 2, information word 202-M, in this example, includes five bytes of user information and three bytes which have been padded and include so-called fill. In this example, not to be construed as limiting the scope of the invention, the number M of packet information words can be zero (0) to 255, each packet information word includes eight bytes and each byte includes eight bits. Although the bytes of information are shown as being in parallel, it will be apparent that they could also be arranged in series. The packet format as shown in FIG. 2 is formed by packetizers 105 in a manner that will be apparent to those skilled in the art.

Input local packet interface 106 also partially generates transport word 201 as shown in FIG. 3. In this example, transport word 201 also includes eight bytes with each byte having eight bits. Again, although the transport word bytes are shown as being in parallel they could equally be arranged in series. Thus, the transport word is the same size as each of the packet information words and will appear as such if supplied as an input to one of packetizers 105. BYTE (0) through BYTE (3) are employed for system address purposes and are designated the system address field. In this example, bit positions designated DEST (0) through DEST (11) form a destination field and are used to identify a packet network node address. As will be apparent to those skilled in the art, the bit positions designated VCID (0) through VCID (19) may be used to further identify the final destination of the corresponding packet and represent a so-called virtual circuit identification. In this example, bit positions VCID (16) through VCID (19) are designated a destination extension (DEST EXT) field. If the destination of the packet is the instant packet network node, the DEST EXT field indicates which one of output ports 110-(X+1) through 110-(X+Y) is to be supplied with the packet. The remaining VCID bits are employed to identify the final destination of the packet and for billing purposes.

BYTE (4) includes bit positions designated TYPE (0) through TYPE (4) and BKG (0) through BKG (2). Bit positions TYPE (0) through TYPE (4) indicate the class or grade of service assigned to the corresponding packet and is designated the type of packet field. Bit position TYPE (0) indicates if the packet is alternate routable. Thus, a logical 1 in bit position TYPE (0) indicates that the packet is alternate routable, and a logical 0 indicates it is not. In this example, normally only statistical packets are alternate routable. The only instances that a periodic packet would be alternate routed are if there was a failure in the primary route assigned to the destination for the packet or for some reason the packet was assigned a class of service requiring a minimum delay. Bit position TYPE (1) indicates the type of packet, i.e., statistical or periodic. That is, if the information words of the packet include bursty information, the packet is designated a statistical packet, and if the information words of the packet, include circuit type information, e.g., PCM encoded voice or the like, the packet is designated a periodic packet. Thus, a logical 1 in bit position TYPE (1) indicates a periodic packet, while a logical 0 indicates a statistical packet. Bit positions TYPE (2) and TYPE (3) are employed to select the values of thresholds employed in scheduler 113, as described below. Bit position TYPE (4) indicates whether or not the packet is assigned a minimum delay class of service. Bit positions BKG (0) through BKG (2) are designated the breakage field and indicate the number of bytes in the last information word M of the packet that do not include user information being transmitted and, hence, have been padded. It will be apparent that bit positions BKG (0) through BKG (2) could equally be used to indicate the number of bytes including user information in the last information word.

BYTE (5) includes bit positions SIZE (0) through SIZE (7) which are designated the SIZE field. Bits are placed in the SIZE field which indicate the number M of information words, i.e., quanta, in the corresponding packet. That is, bits representative of the packet length indicator are placed in the SIZE field. Again, in this example, M can be zero (0) to 255.

BYTE (6) includes six vacant bit positions for a plurality of first parity check bits which form a first prescribed parity check pattern to be inserted by parity unit 107 and bit positions SGZ and EXG. The six vacant bit positions are designated the first parity check field. Bit position SGZ, in this example, indicates whether or not the packet includes a number of information words greater than or equal to zero (0). If the packet length is not greater than zero, the packet length indicator bits are not needed and information can be transmitted in the SIZE field of BYTE (5) of the transport word. Thus, if only one (1) byte of information is to be transmitted, SGZ is set to a logical 0 and the byte of information is inserted into the bit positions of the SIZE field in BYTE (5), in place of the packet length indicator bits. BYTE (5) is available because there is no need in such a packet for a packet length indicator because one packet word is assumed. It will be apparent to those skilled in the art that this technique can be extended to transmit two or even three bytes of information in the transport word and, therefore, eliminate the need to transmit additional information words in this situation. It should also be noted that additional ones of the transport word fields may be usable to transmit user information. The use of the additional fields in the transport word will also increase transmission efficiency by minimizing the number of information words that need to be transmitted. One example, where additional transport word fields may be used to transport information is a control packet. Bit position EXC in BYTE (6) is used to indicate whether or not the packet is a control packet.

BYTE (7) includes eight vacant bit positions for a plurality of second parity check bits forming a second prescribed parity check pattern to be inserted by parity unit 107. The eight vacant bit positions of BYTE (7) are designated the second parity check field.

Input local packet interface 106 supplies the packet information to parity unit 107 on a byte-wise basis. Also supplied to parity unit 107 are an ENABLE signal and a start of packet (SOP) signal. The ENABLE signal indicates a valid byte of information is available and the SOP signal indicates the beginning of a packet and, hence, the beginning of a transport word.

Parity unit 107, in each of packetizers 105 generates prescribed parity check bits which form a plurality of prescribed parity check patterns that are inserted into the vacant bit positions of BYTES (6) and (7) of the transport word, as indicated in FIG. 4. FIG. 4 also indicates that reference code word Xref, shown in dashed outline, is employed in generating the prescribed parity check bits which form, in this example, the plurality of prescribed parity checks. It will be apparent to those skilled in the art, that use of reference code word Xref is not necessary in practicing certain aspects of the invention. Indeed, either EVEN or ODD parity can be used in generating the prescribed parity check bits. Use of Xref and the number of bits included in Xref is determined by the number of network layers including private networks in a particular system. Additionally, it will also be apparent that the number of prescribed parity checks and the bit patterns used in computing the parity check bits used in practicing the invention is dependent on the degree of robustness desired in the system. In this embodiment of the invention, two prescribed parity checks including 14 parity check bits are used to obtain a desired level of robustness. That is to say, each bit from the bit positions of BYTE (0) through BYTE (6) of the transport word is used in computing at least two different parity check bits.

Accordingly, parity unit 107 is supplied with start of packet signal (SOP), an ENABLE signal and packet information BYTE from input local packet interface 106. The SOP signal indicates the beginning of the corresponding packet and, hence, the beginning of the transport word. The ENABLE signal indicates that a valid BYTE of packet information is available. In this example, a first prescribed parity check is generated, in well known fashion, over the bits in each of vertical columns, i.e., groups of bit positions, of BYTE (0) through BYTE (5), and can be either EVEN parity or ODD parity, as desired or as indicated below when using reference code word Xref. That is to say, a separate parity check bit is generated over each of the vertical columns of BYTE (0) through BYTE (5). The first prescribed parity check bits which are generated for BYTE (0) through BYTE (5) are PBYT (0) through PBYT (5), respectively, and form the first prescribed parity pattern which is inserted into the first parity check field in BYTE (6) of the transport word, as shown in FIG. 4. It will be apparent that the parity for generating the individual parity check bits need not be restricted to a byte but can be computed from bits in any number of bit positions in one or more bytes, or groups of bit positions. For example, parity can be computed from bits in specific ones of the functional fields of the transport word. In this example, a second prescribed parity check is generated, in well known fashion, over predetermined ones of the bits in each of the horizontal rows designated BIT (0) through BIT (7), i.e., from predetermined similar bit positions in each group of bit positions. The parity generated for each row can also be either EVEN parity or ODD parity, as desired. It is noted that, in this example, a parity check bit is generated for each of horizontal rows BIT (0) through BIT (7) including the bits in BYTE (0) through BYTE (6). Thus, parity check bits in bit positions PBYT (0) through PBYT (5) are included in the computation of parity check bits forming the second prescribed parity check. Again, this increases the robustness of the system so that the likelihood of a packet information word emulating a transport word is greatly reduced. Thus, a separate parity check bit is generated for each of horizontal rows BIT (0) through BIT (7). The second prescribed parity check bits which are generated for horizontal rows BIT (0) through BIT (7) are PBIT (0) through PBIT (7), respectively, and form the second prescribed parity check pattern which is inserted into the second parity check field in BYTE (7) of the transport word, as shown in FIG. 4. It is noted, however, that the parity check bits may be computed from bits in any desired pattern of bit positions in the transport word. Indeed, any desired number of parity checks may be employed in practicing aspects of the invention to realize any desired level of robustness.

As indicated above, the use of reference code word Xref guarantees transparency for a large number of user networks. Additionally, the use of reference code word Xref causes the probability that a private network transport word can emulate a public system transport word to be zero. In this example, reference code word Xref includes bits Xref (0) through Xref (11). Xref (0) through Xref (7) are associated with horizontal rolls of bits designated BIT (0) through BIT (7), respectively, and Xref (8) through Xref (11) are associated with BYTE (0) through BYTE (3), respectively. It should be noted that the number of bit positions in Xref can be increased or decreased, respectively as desired. Additionally, the bits of Xref can be applied to any desired bit positions in the transport word. For example, individual ones of the bits of Xref can be associated with a specific functional field of the transport word. The parity check bits generated over the bits of BYTE (4) and BYTE (5) can be either EVEN or ODD, as desired. Logical signals in the bit positions of Xref designate the type of parity generated over the associated roll of bits and the associated BYTES. In this example, a logical 1 in a bit position of Xref designates EVEN parity, while a logical 0 designates ODD parity. Thus, Xref can be set to any desired combination of logical 1's and logical 0'. However, it should be noted that Xref is the same for a predetermined network or community of nodes. Again, the unique prescribed parity checks are used in conjunction with the packet length indicator, in accordance with aspects of the invention, to delimit the packets and effect packet synchronization. Moreover, the use of the unique prescribed parity checks provides verification of the transport word fields. Additionally, as described below, a unique reference code word Xref can be assigned to a specific transport user to provide a unique identity for its packets and to assure transparency of its packets in the system hierarchy.

Again, each of packetizers 105 generates the packet format as shown in FIG. 2, in a manner which will be apparent to those skilled in the art, by accumulating the number M of information words 202 in the packet and appending the transport word 201 to them. To this end, each of input local packet interfaces 106 stores the information words and inserts the appropriate information concerning the packet into the fields of the transport word as shown in FIG. 3. This information includes the address information to be placed in the address field including the network destination in bit position DEST (0) through DEST (11) (FIG. 3), and the destination extension (DEST EXT) in bit positions VCID (16) through VCID (19) and the final destination in the remaining VCID bits. The type information is inserted into bit positions TYPE (0) through TYPE (4). The type of packet whether statistical or periodic is usually provided at call set up or otherwise known by the originating packetizer. The breakage information is inserted into bit positions BKG (0) through BKG (2) and is readily obtained by knowing the number of bytes of information in the packet being formatted or the number of bytes of information in the last information word of the packet. Similarly, the packet size information is inserted into bit positions SIZE (0) and SIZE (7). This is readily obtained by knowing the number of information words being stored for the packet being formatted. The packet size greater than zero information is inserted in bit position SGZ. If the packet information is in only one byte, a logical zero is inserted in the SGZ field and the byte of information is inserted in the transport word SIZE field. Again, this information is readily obtained from the number of bytes of information being stored for the packet being formatted. Finally, information indicating whether or not the packet is a special packet is inserted in bit position EXC.

It should be noted that, when there is no information being stored to be formatted into either an information packet or a control packet, input local interface 106 in conjunction with parity unit 107 generates a so-called stuff packet. Stuff packets are generated in the same manner as the information and control packets described above. The differences being that the number of information words in the stuff packet is zero as indicated by the size field and SGZ, and the destination field indicates to scheduler 113 that the stuff packet should be scheduled for statistics gathering and be directed to statistics port 116. The stuff packet is comprised of just a transport word.

The packets, whether information, control or stuff are supplied to parity unit 107 on a byte-wise basis along with an ENABLE signal and a start of packet (SOP) signal. Parity unit 107 in response to the ENABLE and SOP signals operates to generate the first and second parity checks, as described above. The generated first parity check bits PBYTE (0) through PBYTE (5) are inserted into the first parity check field and the generated second parity check bits PBIT (0) through PBIT (7) are inserted into the second parity check field. The first and second parity checks are employed in conjunction with the packet length indicator, in accordance with an aspect of the invention, to delimit the packets and synchronize the system. As indicated above, parity unit 107 is also supplied with reference code word Xref which is employed, in accordance with an aspect of the invention, to generate the first and second parity checks which provide a desired level of robustness to the synchronization process. Additionally, the use of reference code word Xref provides a unique identity for a network and also assures that the network user's packets are transparent in the public system hierarchy. The resulting transport word for the formatted packet is shown in FIG. 4.

A specific transport user can employ a packetizer essentially identical to packetizer 105 to generate packets or employ packet network nodes essentially identical to packet network node 100 in a private network. Then, a unique reference code word Xref is assigned to the specific transport user to provide a unique network identity. The packets generated with the unique reference code word are assured to be transparent in the public system hierarchy. The broadband packets generated in the private network are identical to the broadband packets described above. Consequently, the private network packets including their transport words appear as information to packetizer 105 in packet network node 100 and, therefore, are transparent. Packet network node 100 simply appends a transport word to the supplied information to form packets. When the private network packets reach the transport user's private network, the public network transport word is removed and its unique reference code word Xref is recognized and the private network packets are transmitted therein. The packets are supplied on a byte-wise basis from packetizers 105-1 through 105-Y to input ports 104-(X+1) through 104-(X+Y), respectively. Also supplied from packetizers 105-1 through 105-Y are corresponding ENABLE IN signals. The ENABLE IN signal indicates to the corresponding input port that a valid byte of packet information is available to be supplied.

It is important to note that the use of the first and second parity checks, in this example, is powerful enough to verify the data fields in the transport word. This eliminates the need of an additional separate check for the transport word fields as was required in prior arrangements. Additionally, although so-called group processing is advantageously employed in practicing aspects of the invention, it will be apparent that other types of processing may be employed.

INPUT PORT

FIG. 5 shows details, in simplified block diagram form, of input ports 104. Accordingly, shift bytes unit 501 is supplied an ENABLE IN signal, the reference code word Xref and packet bytes in parallel via BYTE IN. ENABLE IN is at an incoming clock rate and indicates that a valid packet byte is available for this input port. ENABLE IN is also supplied to byte counter 502. Shift bytes unit 501 includes a word wide shift register, parity generators and a comparator (not shown). In this example, a word includes eight (8) bytes in series and each byte includes eight (8) parallel bits.

Shift bytes unit 501 operates initially to generate the first and second parity checks, as described above, in relationship to parity unit 107 (FIG. 1) in well known fashion, over each eight bytes supplied thereto on a byte-by-byte basis. If a match is obtained between the generated first and second prescribed parity checks, and the expected first and second parity patterns in the predetermined fields of the packet word, i.e., PBYT (0) through PBYT (5) and PBIT (0) through PBIT (7), a Tok=1 is generated. Outputs from shift bytes unit 501 are the packet word (WORD), the packet length field (SIZE), the packet length greater than zero field (SGZ), and a transport word candidate indicator (Tok). Shift bytes unit 501 supplies as outputs SIZE, SGZ and Tok which, in turn, are supplied to control 506. The packet WORD is supplied to word latch 503 where it is stored until write time slot 0 occurs in the polling cycle of packet cross connect 103, at which time RAM 504 is enabled to write the WORD. Appropriate fields of the packet WORD are also written into scheduler data store 505 if it is a transport word candidate as indicated by Tword=1. The packet WORD is written into a memory location in RAM 504 identified by an address generated by RAM address generator 509. RAM address generator 509 is responsive to a word complete (WC) signal from byte counter 502 to advance a write address counter during the write time slot. RAM address generator 509 is also operative to pass address signals from address bus ABUS to read a packet WORD from RAM 504 which is supplied to databus DBUS and, consequently, to the one of output ports 110 (FIG. requesting the corresponding WORD. It is noted that anyone of output ports 110 can read a word from any given input port 104 during a polling cycle. In this example, RAM 504 has the capability of storing 4K words.

Byte counter 502 is responsive to ENABLE IN for counting the number of packet bytes supplied to input port 104. A word complete output (WC) from byte counter 502 indicates that a packet word, in this example, 8 bytes, is complete and is supplied to word counter 507, word latch 503, scheduler data store 505, status latch 508 and RAM address generator 509.

In response to the word complete (WC) signal, word latch 503 latches the WORD from shift bytes unit 503; status latch 508 latches the WORD COUNT from word counter 507, Tword from control 506 and lpkTok from control 506; RAM address generator 509 is enabled to be advanced by one address; and scheduler data store 505 is enabled to input data. It is noted that a WC signal is also generated when byte counter 502 is reset.

Word counter 507 is responsive to the WC output from byte counter 502 to count the number of packet words supplied to input port 104. The count of packet words (WORD COUNT) is supplied to status latch 508 and to control 506.

Scheduler interface 510 interfaces input port 104 to TBUS.

Control 506 is responsive to the supplied SIZE field, SGZ field, Tok and WORD COUNT for controlling input port 104 to synchronize on the incoming packets. To this end, control 506 generates a signal Tword, which indicates whether or not the packet word is a possible transport word candidate and a signal lpkTok which indicates whether or not the last packet transport word was valid, i.e., ok. Tword and lpkTok are supplied to status latch 508.

Figure 6:
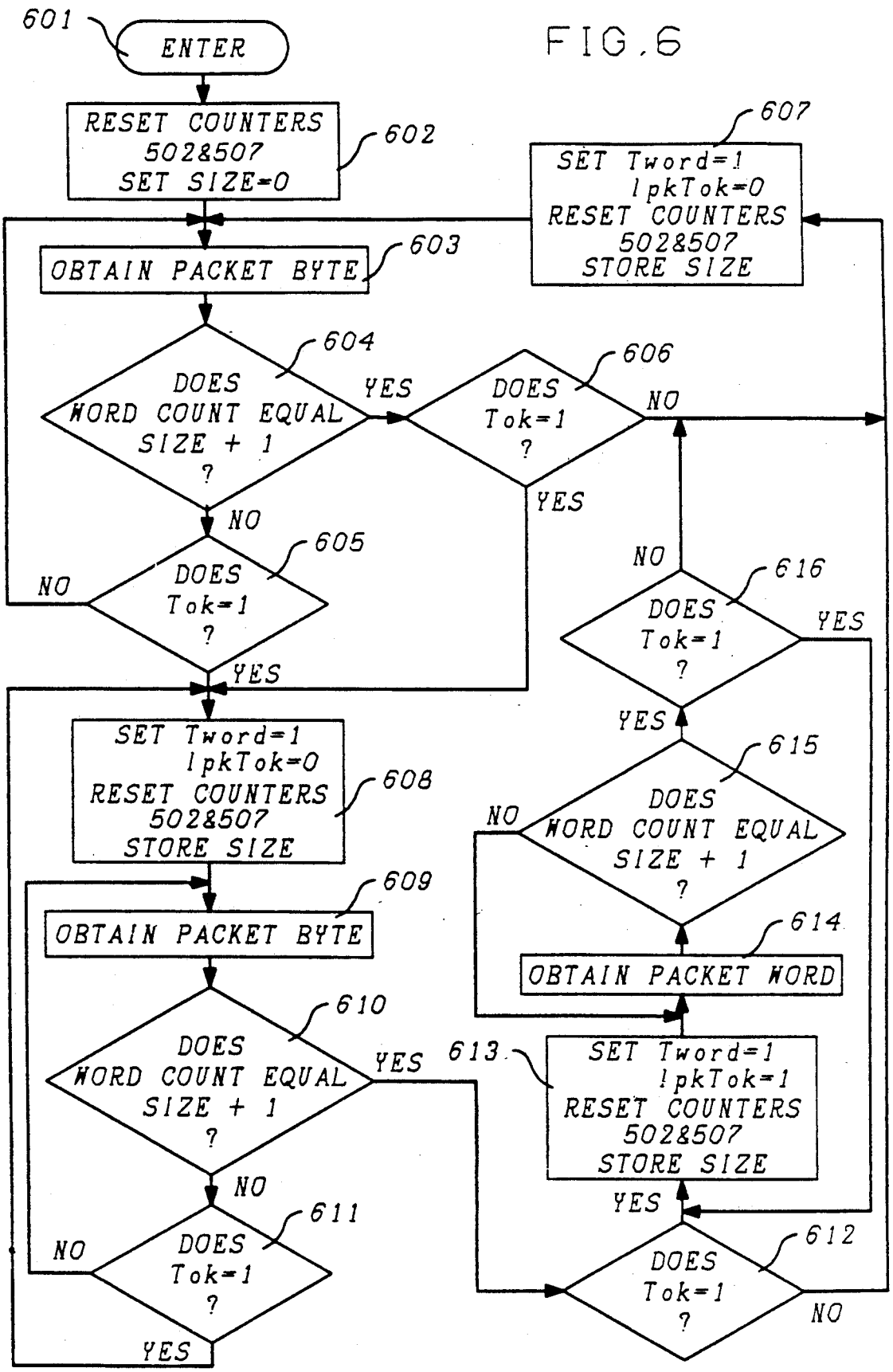
FIG. 6 depicts a flow chart illustrating operations performed in control 504 in controlling input port 104 of FIG. 5.

Operation of control 506 in obtaining frame synchronization of input port 104 for incoming packets can be explained by referring to the flow chart shown in FIG. 6. Accordingly, the control routine is entered via enter step 601. Thereafter, operational block 602 initializes byte counter 502 and word counter 507 by resetting them and the stored packet SIZE is set to zero (0) packet words, i.e., M=0. Input port 104 is defined to be in an OUT-OF-FRAME mode. Operation block 603 indicates that a packet byte has been supplied to shift bytes unit 501. As indicated above, shift bytes unit 501 generates the predetermined first and second parity check bits and compares them to the first and second parity check bits in the predetermined fields of the packet word, namely, PBYTE (0) through PBYTE (5) in BYTE (6) and PBIT (0) through PBIT (7) in BYTE (7) (FIG. 4). If a match is obtained a Tok=1 is generated. Otherwise, a Tok=0 is generated. Conditional branch point 604 tests to determine whether or not the WORD COUNT in word counter 507 is equal to the number of packet words indicated by SIZE plus one (1), i.e., M+1. In the initial pass of the process, step 604 yields a YES result after the first word has been supplied to shift bytes unit 501 (FIG. 5). On subsequent passes, the packet length indicator value M is obtained from the expected SIZE field and the SGZ field in the packet word, namely, BYTE (5) and the SGZ bit position in BYTE (6). If the test result in step 604 is NO, conditional branch point 605 tests to determine if Tok=1. If the test result in step 605 is NO, control is returned to operational block 603. Thereafter, steps 603, 604 and 605 are iterated until either step 604 yields a YES result or step 605 yields a YES result. If step 604 yields a YES result, conditional branch point 606 tests to determine if Tok=1. If the test in step 606 is NO, operational block 607 sets Tword=1, and lpkTok=0, resets byte counter 502 and word counter 507, and causes the expected number of information words (M) in the packet from the SIZE field to be stored. Signal lpkTok indicates whether or not the last packet transport word candidate is valid or not. Accordingly, lpkTok=0 indicates that the last packet transport word candidate is not valid and lpkTok=1 indicates that it is valid. Resetting of byte counter 502 generates a WC signal. Consequently, the current WORD from shift bytes unit 501 is latched in word latch 503; the WORD COUNT from word counter 507, Tword from control 506 and lpkTok from control 506 are latched in status latch 508; RAM address generator 509 is enabled to be advanced an address; and scheduler data store 505 is enabled to store data. Upon write time slot 0 occuring in the synchronous polling cycle of packet cross connect 103, the address in RAM address generator 509 is advanced and the packet WORD from word latch 503 is written into the memory location of RAM 504 identified by RAM address generator 509. Similarly, upon the write time slot occurring in the polling cycle of packet cross-connect 103 and Tword=1 from status latch 508, the DEST, DEST EXT, and TYPE fields from the packet WORD stored in word latch 503 are written into scheduler data store 505. Additionally, the corresponding address designating the packet starting address (SAD) from RAM address generator 509 for the packet word is also written into scheduler data store 505. Thereafter, appropriate ones of steps 603 through 607 are iterated until either step 605 or step 606 yields a YES result. Either of these YES results indicates that a possible transport word candidate has been identified and a so-called ALMOST IN-FRAME mode of operation is entered. To this end, operational block 608 sets Tword=1 and lpkTok=0, resets byte counter 502 and word counter 507, and causes the number of information words M from the SIZE field to be stored. Again, the resetting of counter 502 causes generation of a WC signal which, in turn, causes the actions to occur as set forth above in step 607. Operational block 609 indicates that another packet byte has been supped to shift bytes unit 501. Then, conditional branch point 610 tests to determine if the WORD COUNT in word counter 507 equals SIZE+1. SIZE+1 is the total length of the packet and points to the expected next packet transport word. If the test result in step 610 is NO, conditional branch point 611 tests to determine if Tok=1. If the test result in step 611 is NO, the current packet WORD in shift bytes unit 501 is not a valid transport word candidate and steps 609 through 611 are repeated until either step 610 or step 611 yields a YES result. If step 610 yields a YES result, conditional branch point 612 tests to determine if Tok=1. If the test result in step 612 is NO, the packet WORD presently in word latch 503 is not a valid transport word candidate. Control is returned to step 607 and appropriate ones of steps 603 through 612 are iterated. If step 611 yields a YES result, the current packet WORD in word latch 503 is not a valid transport word and steps 608 through 611 are iterated until step 610 yields a YES result and step 612 is reached. A NO result in step 612 again indicates that the present packet WORD being pointed to by the previous packet length indicator is not a valid transport word and the reframing process is reinitiated by returning control to step 607. When step 612 yields a YES result, the WORD latched in word latch 503 is a valid transport word and input port 104 is in synchronism with the incoming broadband packets. An IN-FRAME mode of operation has been entered.

To summarize, steps 603 through 607 operate on the incoming packet on a byte-by-byte basis to identify a first transport word candidate. Then steps 608 through 612 operate on the incoming packet also on a byte-by-byte basis to identify a subsequent transport word candidate pointed to by the packet length indicator from the previous transport word candidate. Upon detection of the subsequent transport word candidate pointed to by the packet length indicator from the previous transport word candidate, the previous transport word candidate is identified as a valid transport word, in accordance with an aspect of the invention.

Once a valid transport word has been identified, operation of input port 104 enters an IN-FRAME mode. In the IN-FRAME mode, testing for transport word candidates, in this example, is done on a word wise basis. To this end, operational block 613 sets Tword=1 and lpkTok=1, resets byte counter 502 and word counter 507 and causes the number of information words in the packet from the SIZE field to be stored. This indicates that a GOOD transport word and, hence, a GOOD packet has been identified. That is to say, the last packet received has been identified as a GOOD packet. Thereafter, operational block 614 indicates that a packet word has been supplied to shift bytes unit 501. Then, conditional branch point 615 tests to determine if the WORD COUNT in word counter 507 equals SIZE+1. If the test result in step 615 is NO, steps 613 and 614 are repeated unit a YES result in step 615 is obtained. Thereafter, conditional branch point 616 tests if Tok=1. If the test result in step 616 is YES, another GOOD packet has again been identified. Again, the WORD COUNT from word counter 507, and Tword and lpkTok signals from control 506 are written into status latch 508 in response to a word complete (WC) signal. In turn, the stored WORD COUNT and lpkTok signal are written into scheduler interface 510 during the write time slot of the polling cycle of cross-connect 103. When lpkTok=1 the packet transport data stored in scheduler data store 505 for the last previous packet and lpkTok are supplied via scheduler interface 510 to cross connect 103 transport bus TBUS for use by scheduler 113. That is, the packet transport information fields DEST, DEST EXT, WORD COUNT and TYPE, the packet starting address (SAD) and the last packet status lpkTok are supplied to TBUS. The packet source (SCR), i.e., input port, is known to scheduler 113 by the time slot in the polling cycle during which the transport information was supplied to TBUS. If the test result in step 616 is NO, the operation of input port 104 re-enters the OUT-OF-FRAME mode, control is returned to step 607 and the reframing process is reinitiated.

STUFF PORT

Stuff port 109 generates so-called stuff packets which are stored in buffer memory for use by output ports 110-1 through 110-(X+Y) when no other packets are available for transmission. The stuff packets each comprise only a transport word which is generated in identical manner as described above regarding packetizers 105. The DEST field, however, includes a predetermined destination which indicates that the packet is a stuff packet and eventually will be used to determine facility activity. To this end, stuff port 109 interfaces with address bus ABUS and data bus DBUS.

OUTPUT PORT

FIG. 7 shows details, in simplified block diagram form, of each of output ports 110. As indicated above, each of output ports 110 interfaces with cross-connect 103 address bus ABUS, scheduler bus SBUS, data bus DBUS and total quanta bus TQBUS. As explained below, scheduler 113 supplies packet output information via SBUS concerning packets to be transmitted by output ports 110. This information includes the output port identity, the input port identity (SRC), the starting address (SAD) of the packet being stored in the corresponding input port, WORD COUNT (total length) of the packet and the TYPE of packet, i.e., periodic or statistical. Output port 110 operates on this information, in accordance with aspects of the invention, to schedule transmitting of statistical packets and to reserve intervals for transmitting periodic packets.

The packet output information is obtained from SBUS at the appropriate one of output ports 110 by queue controller (QCON) 701. QCON 701 determines from TYPE whether the packet is a periodic packet or a statistical packet. If it is a periodic packet, the input port identity (SRC), packet starting address (SAD) and total length, i.e., WORD COUNT (M+1) in packet word intervals, of the packet are stored in periodic queue 702, REAL QSUM counter 703 is incremented by the WORD COUNT and RESERVED QSUM counter 704 is decremented by the WORD COUNT. It is noted that the value RESQSUM in RESERVE QSUM counter 704 cannot be less than zero (0). RESQSUM is supplied to adder 709 and TQBUS. If the packet is statistical, the input port identification (SRC), packet starting address (SAD) and the WORD COUNT for the packet are stored in statistical queue 705; REAL QSUM counter 703 is incremented by the WORD COUNT; and RESERVE QSUM counter 704 is incremented by a value representative of a reserved interval (RI), namely, RI=(k/1−k)(M+1), of packet words.

Figure 10:
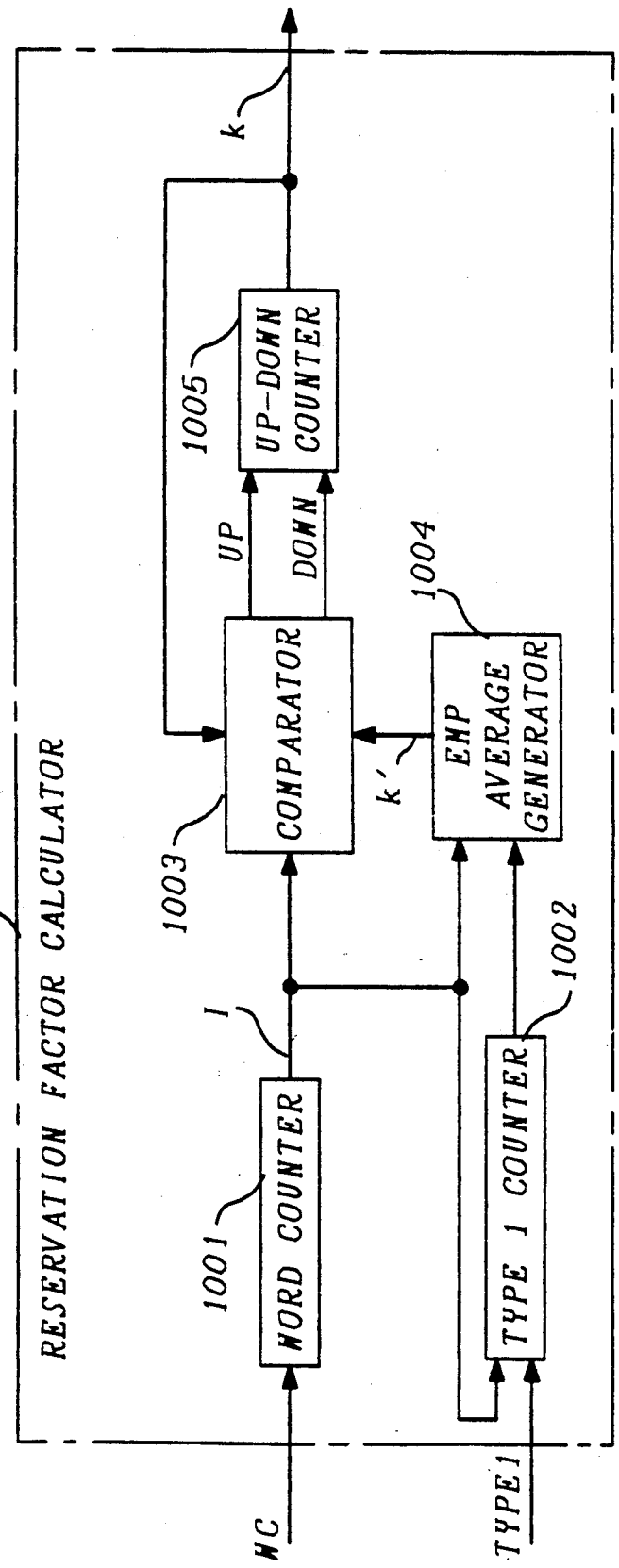
FIG. 10 depicts details, in simplified block diagram form, of reservation factor calculator 716 used in output ports 110 shown in FIG. 7.

Reservation factor k, in this example, is representative of the percentage of periodic packets expected to be transmitted from a corresponding output port. The value of reservation factor k can be a predetermined fixed value, a value supplied by a processor based on call set-up or calculated dynamically by reservation factor calculator 716. Reservation factor calculator 716 is responsive to the word complete signal WC and the number of periodic, i.e., Type 1, packet words being transmitted by output port 110 during a predetermined interval to generate the value of reservation factor k. Details of reservation factor calculator 716 are shown in FIG. 10 and described below.

Both periodic queue 702 and statistical queue 705 are, in this example, first in first out (FIFO) registers and interface with next packet unit 706. REAL QSUM counter 703 is decremented by one packet word in response to a word complete (WC) signal from byte counter 707. This follows because a packet word has been transmitted. Time unit 708 generates a refence time T, which is arbitrary time, e.g., now. Time unit 708 is also incremented by a packet word interval in response to the WC signal. Since in this packet network node, packets are continuous and contiguous in the byte intervals designated by ENABLE, this is a smooth process.

Adder 709 combines the REAL QSUM and RESQSUM to obtain TQSUM, namely, $$TQSUM = REAL\ QSUM + RESQSUM, \qquad (1)$$

where the individual values are in packet word intervals and TQSUM is representative of the queuing delay in the output port. In turn, TQSUM is supplied to adder 710 and TQBUS. Adder 710 is enabled in response to arriving statistical packets at statistical queue 705 to combine TQSUM and time T to obtain the scheduled time of service value STOS for each corresponding statistical packet, namely, $$STOS = TQSUM + T. \quad (2)$$

Figure 8:
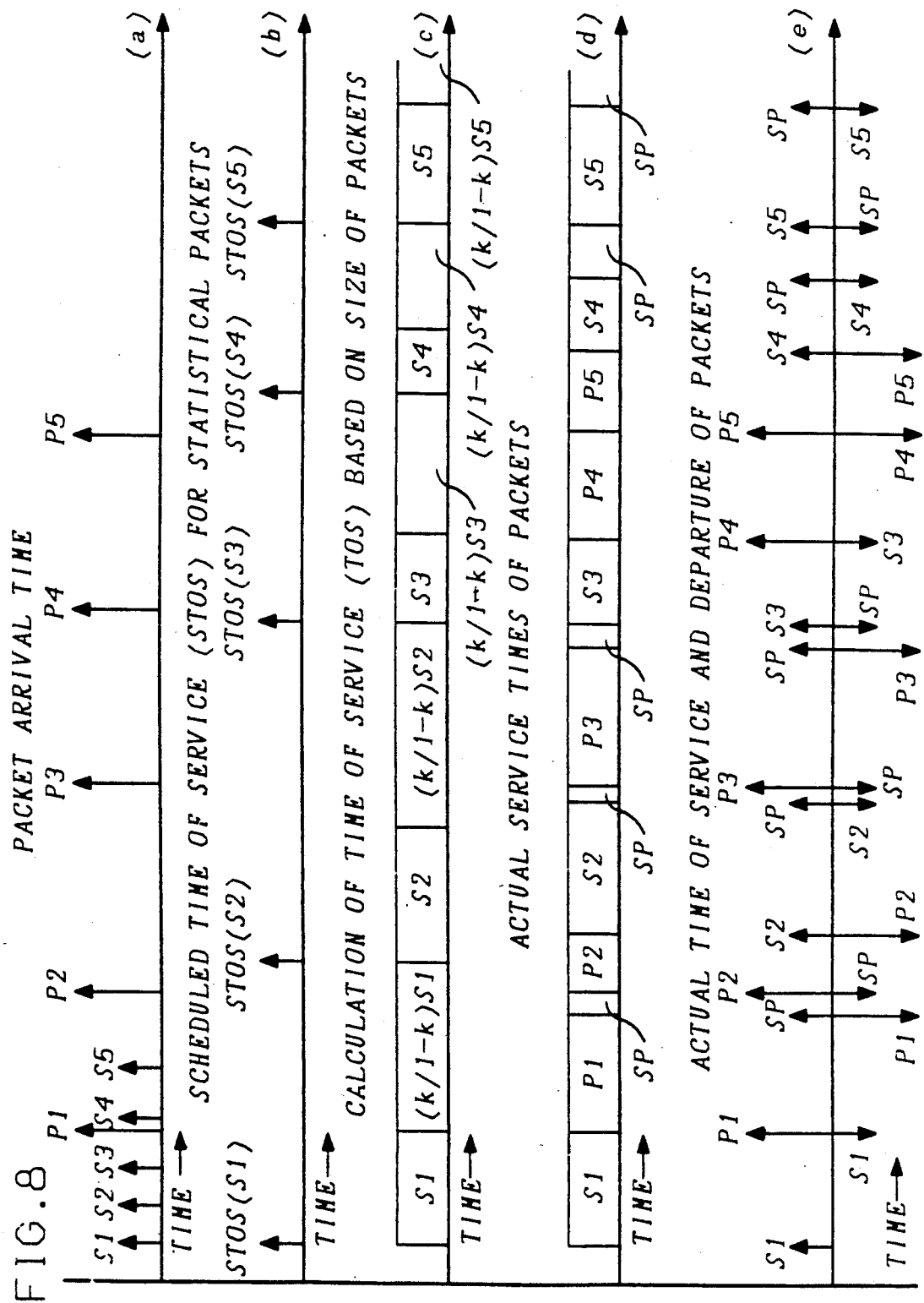
FIG. 8 depicts a sequence of timing diagrams useful in describing the operation of packet cross-connect 103 of FIG. 1 and output ports 110 of FIG. 7.

This operation will become more apparent from the discussion of FIGS. 8 and 9 below.

The STOS values for the arriving statistical packets are stored in scheduled time of service (STOS) queue 711 which, in this example, is also a FIFO register. The next scheduled time of service (NSTOS) at the top of the FIFO in STOS queue 711 is supplied to next packet unit 706. Also supplied to next packet unit is time T and a packet complete (PC) signal from word counter 712. Next packet unit 706 operates to supply the starting address (SAR) and the input port identity (SRC) of the packet to be transmitted to address counter 713 and the total packet length M+1 as indicated by WORD COUNT to word counter 712. If the next packet to be transmitted is a statistical packet, supplying of this information is delayed at least until the scheduled time of service (STOS) occurs or, thereafter, until transmission of a periodic or stuff packet has been completed. If there is no information regarding periodic packets to be transmitted in periodic queue 702 and the next scheduled time of service (NSTOS) for a statistical packet has not occurred stuff packets are requested by supplying the address of a stuff packet in stuff port 109 to address counter 713. Next packet unit 706 supplies as an output a logical 1 STUFF signal when a stuff packet is being transmitted. The STUFF signal is supplied to a corresponding one of output local packet interfaces 112 (FIG. 1), to REAL QSUM counter 703 and RESERVE QSUM counter 704. It is noted that the STUFF signal is not required to be supplied to output facility interfaces 111. REAL QSUM counter 703 is responsive to the logical 1 STUFF signal to inhibit its decrement input (−) so that the REAL QSUM is not decremented in response to a word complete signal WC. This follows because the REAL QSUM count was not incremented in response to the stuff packet request. The STUFF signal is also supplied to the decrement input of RESERVE QSUM counter 704 and the RESQSUM count is decremented by one packet word in response to the logical 1 STUFF signal. Address counter 713 supplies the address of the requested packet word to address bus ABUS and, in turn, the identified word in the corresponding one of input ports 104 RAM memory or stuff port 109 is read to data bus DBUS and supplied to word latch 714. Byte converter 715 supplies the packet words a byte at a time in response to ENABLE OUT from a corresponding output interface. ENABLE OUT is also supplied to byte counter 707 which generates a word complete (WC) signal when the appropriate number of bytes have been transmitted. In this example, a packet word includes eight bytes in series and each byte includes eight bits in paralle. The WC signal is also supplied to word counter 712, address counter 713, word latch 714, byte converter 715 and reservation factor calculator 716. Word counter 712 is responsive to WC and the total length of the packet, i.e., WORD COUNT, to generate a packet complete (PC) signal when the number of packet words transmitted equals WORD COUNT. Packet complete signal PC is supplied to next packet unit 706 to initiate transmission of the next packet. Word counter 712 also supplies a first packet word signal to byte counter 707 which, in response thereto, generates a start of packet (SOP) signal. Address counter 713 is responsive to the WC signal to advance the address by one word and, hence, identify the memory location in the appropriate input port RAM storing the next packet word to be supplied via DBUS to word latch 714. The STUFF and SOP signals are supplied to a corresponding one of output local packet interfaces 112-1 through 112-Y. The STUFF and SOP signals are not supplied to output facility interfaces 111-1 through 111-X because they are not needed. It is noted that, through this process, in accordance with an aspect of the invention, any one of output ports 110 can address any packet in any one of the RAM memories of input ports 104 during the synchronous polling cycle. Additionally, this feature allows a so-called broadcast mode of operation in cross-connect 103. That is to say, any number of output ports 110 can address the same packet in a particular one of input ports 104 during a polling cycle and, hence, simultaneously supply that same packet as an output. Consequently, any problems of prior packet transmission and/or switching arrangements caused by so-called head of the line blockage is eliminated. This results in greater throughput in cross-connect 103 and, hence, in any network in which it is employed. Output port status unit 717 provides a status indication, i.e., whether the output port is functioning properly or not, to processor 114 of FIG. 1.

Operation of output port 110, in accordance with aspects of the invention, can best be explained by way of examples. Accordingly, FIG. 8 shows a sequence of timing diagrams (a) through (e) illustrating operation of output port 110 for arriving statistical, periodic and stuff packets. Thus, FIG. 8(a) shows arrival times for statistical packets S1, S2, S3, S4 and S5 and for periodic packets P1, P2, P3, P4 and P5. The arrival of the stuff packets is not shown because they do not directly affect the calculation of the scheduled time of service for the statistical packets. It is assumed that upon arrival of statistical packet S1, that transmission has just been completed for either a periodic or stuff packet, and there are no other packets to be transmitted and there is no reserved interval for transmitting periodic packets. Consequently, statistical packet S1 is scheduled for service immediately. This follows from equation (2) since the REAL QSUM is zero (0) and the RESQSUM is zero (0) and, consequently, TQSUM is zero (0). Therefore, the scheduled time of service for packet S1 is time T or now, as shown in FIG. 8(b). The REAL QSUM counter 703 is incremented by the WORD COUNT of S1 labeled S1, and the RESERVE QSUM counter 704 is incremented by (k/1−k)(M+1) of S1 designated (k/1−k) S1, as shown in FIG. 8(c). Upon statistical packet S2 arriving, TQSUM is the value of REAL QSUM, i.e., the total length of packet S1 less the number of packet words which have been transmitted, plus RESQSUM, i.e., (k/1−k) S1. Therefore, from equation (2) STOS for packet S2 is T+TQSUM. T is the time at which S2 arrived, and the REAL QSUM and, hence, TQSUM has been decremented by the number of packet words which have been transmitted for packet S1, as shown in FIG. 8(b). REAL QSUM counter 703 is incremented by the WORD COUNT for S2 designated S2, and the RESERVE QSUM counter 704 is incremented by (k/1−k)(M+1) for packet S2, designated (k/1−k) S2, also as shown in FIG. 8(b). This procedure is followed for statistical packet S3. When periodic packet P1 arrives, REAL QSUM counter 703 is incremented by the WORD COUNT for P1 and the RESERVE QSUM counter 704 is decremented by the total length of P1. This follows because an interval, i.e., time, has been reserved, in accordance with an aspect of the invention, for the transmission of periodic packets and normally the net change in TQSUM should be zero (0) regarding scheduling a time of service for subsequently arriving statistical packets. It is noted, however, that when RESQSUM is zero (0), i.e., no time is reserved for transmission of periodic packets and there are no statistical packets to be transmitted, the total length of the periodic packet or packets determines, in part, the calculated scheduled time of service for any arriving statistical packets, see equations (1) and (2). When statistical packets S4 and S5 arrive, each respective scheduled time of service (STOS) is determined as set forth above. The periodic packets P2, P3, P4 and P5 are placed in the periodic queue as they arrive, and the appropriate incrementing of REAL QSUM counter 703 and the decrementing of RESERVE QSUM counter 704 are effected.

The actual service times for the packets are shown in FIG. 8(d), and the actual times of service and departure of the packets are shown in FIG. 8(e). As indicated above, statistical packet S1 was scheduled for service immediately upon its arrival and an interval based on the predetermined relationship to the total length of the statistical packet had been reserved, in accordance with an aspect of the invention, to service periodic packets. Thus, periodic packet P1 presently in the periodic queue is serviced upon completing the transmission of statistical packet S1. Since the transmission of periodic packet P1 is completed prior to the occurrence of the STOS for the next statistical packet S2, and there are no other periodic packets presently in the periodic queue, one or more stuff packets (SP) are transmitted. This is important so that synchronization is maintained in the network and so that information flow is smooth. As noted above, continued synchronization requires that there are continuous and contiguous packets in the network. If there was another periodic packet in the periodic queue it would have been serviced immediately. However, since periodic packet P2 arrives prior to the STOS for statistical packet S2 (FIG. 8(b)), it will be serviced upon completing the transmission of the current stuff packet. Since the stuff packets are only one packet word in total length, the delay in servicing packet P2 is at most only one packet word interval. Since the total length of periodic packet P2 is greater than the remainder of reserved interval (k/1−k) S1, the actual time of service of statistical packet S2 is delayed until transmission of periodic packet P2 is completed, as shown in FIG. 8(d) and (e). Upon completion of transmission of packet S2, periodic packet P3 is serviced. Again, since the transmission of periodic packet P3 is completed before the STOS has occurred for statistical packet S3, stuff packets are transmitted until the STOS for packet S3 occurs. Upon completing the transmission of statistical packet S3, periodic packet P4 is serviced. Since the transmission of periodic packet P4 is completed prior to the occurrence of STOS for statistical S4, and periodic packet P5 is in the periodic queue, it will be serviced immediately upon completing the transmission of periodic packet P4. Service of statistical packet S4 is delayed until the transmission of periodic packet P5 is completed. Then, statistical packet S4 is transmitted. Thereafter, stuff packets are transmitted until the occurrence of STOS for statistical packet S5 at which time it is transmitted. Thereafter, stuff packets are transmitted until additional statistical packets and/or periodic packets have arrived at the output port. By employing this unique multi-queue output scheduling arrangement, in accordance with aspects of the invention, statistical packets are serviced without undue delay. Indeed, the longest interval that a statistical packet can be delayed from its scheduled time of service is an interval equal to that required for the transmission of a maximum length periodic packet which, in this example, is 256 packet words. By employing this unique multi-queue strategy, in accordance with an aspect of the invention, delaying of periodic packets is minimized, obtaining accurate information for scheduler 113 regarding delays encountered by statistical packets is realized and smoothing is achieved of bursty statistical packets streams.

Figure 9:
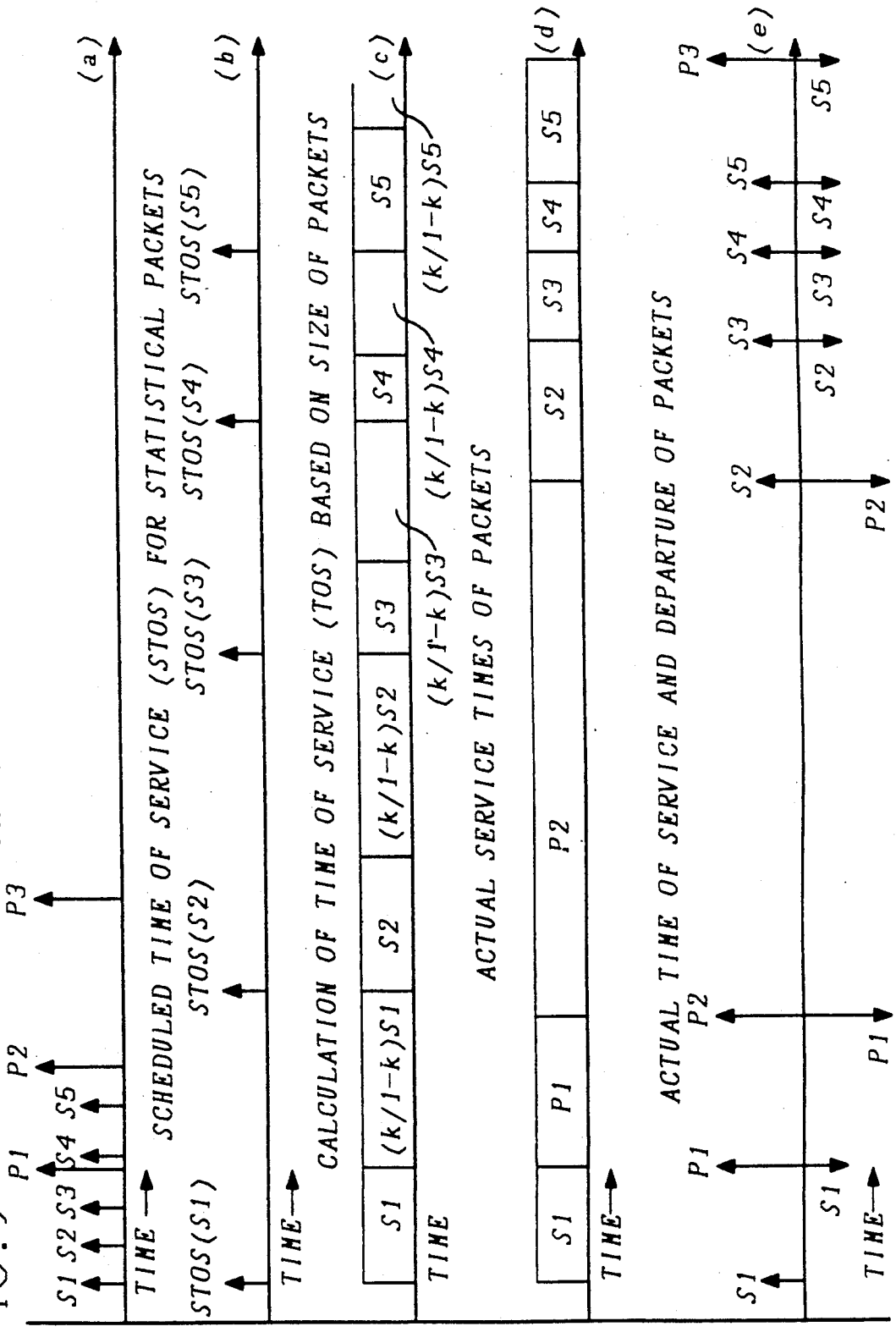
FIG. 9 shows another sequence of timing diagrams also useful in describing the operation of packet cross-connect 103 of FIG. 1 and output ports 110 of FIG. 7.

FIG. 9 shows another sequence of timing diagrams (a) through (e) illustrating operation of output port 110 for another sequence of arriving statistical and periodic packets. FIG. 9(a) again shows arrival times for statistical packets S1, S2, S3, S4 and S5 and periodic packets P1, P2 and P3. It is again assumed that initially the periodic or statistical queues are empty and that there is no reserved interval for transmission of periodic packets. Consequently, from equations (1) and (2) it is seen that statistical packet S1 is serviced immediately, as described above regarding FIG. 8. The remaining statistical packets S2 through S5 are scheduled for service in the manner as described above in relationship to FIG. 8 and their respective STOS's are shown in FIG. 9(b). The corresponding calculated time of service showing intervals reserved for transmission of periodic and/or stuff packets is shown in FIG. 9(c). Again, the intervals shown in FIG. 9(c) are generated as described above in relation to FIG. 8. The actual times of service for the packets and departure of the packets is shown in FIGS. 9(d) and (e). Thus, as shown in this example, statistical packet S1 is first transmitted in a manner as described above regarding FIG. 8. Upon completing the transmission of packet S1, periodic packet P1 is transmitted, in a manner as described above regarding FIG. 8. Since periodic packet P2 is in the periodic queue and the STOS for statistical packet S2 has not occurred, it is serviced upon completing transmission of periodic packet P1. However, as shown in FIG. 9(d), periodic packet P2 is large and exceeds all the reserved intervals RESQSUM for periodic packets in RESERVE QSUM counter 704. Consequently, upon completing the transmission of periodic packet P2, statistical packets S2 through S5 are consecutively transmitted. The statistical packets are transmitted in the manner shown in FIG. 9(d) because their corresponding STOS has passed. There is no reserved interval RESQSUM for the transmission of periodic or stuff packets. The time at which each of the statistical packets is to be transmitted is determined in next packet unit 706 in response to time T and NSTOS. Specifically, if the STOS for the next statistical packet has passed, the corresponding statistical packet is transmitted upon completing the transmission of periodic packet P2. Thus, in this example, and from FIG. 9, it is seen that the STOS's for statistical packets S2 through S3 have passed prior to completing the transmission of periodic packet P2 and that the STOS for statistical packet S4 has passed prior to completing the transmission of packet S3. Consequently, packet S4 is transmitted upon completing the transmission of packet S3. Similarly, the STOS for statistical packet S5 passes prior to completing transmission of statistical packet S4 and, therefore, statistical packet S5 is transmitted immediately upon completing the transmission of statistical packet S4. Periodic packet P3 is not transmitted until there is a reserved interval RESQ-SUM in RESERVE QSUM counter 704, or there are no statistical packets to be transmitted. Thus, the transmission of periodic packet P3 is initiated upon completing the transmission of statistical packet S5. In this manner, statistical packets are assured to be transmitted within a reasonable delay interval. Again, it is noted, that transmission of a statistical packet will be delayed, at most, for an interval required to transmit a maximum length periodic packet. However, in this example, the statistical and periodic packets may encounter unexpected delay intervals and, consequently, the desired smoothing is not realized. This underscores the importance of accurately estimating the value of reservation factor k, i.e., the percentage of the available bandwidth allocated for transmission of periodic packets.

FIG. 10 shows details, in simplified block diagram form, of reservation factor calculator 716 (FIG. 7). Accordingly, word complete signal WC is supplied to word counter 1001. Word counter 1001 generates an output pulse I after a predetermined number of packet words have been counted which denotes a predetermined interval. Type 1 counter 1002 is reset by the output pulse I from word counter 1001 and is incremented by signal TYPE 1 to yield a count of the number of type 1 packet words, i.e., periodic packet words, which have been transmitted during the predetermined interval. Output pulse I also enables exponentially mapped past (EMP) average generator 1004 to update its output value k', which is representative of a smooth average of the number of periodic packets transmitted during the predetermined interval. Similarly, output pulse I enables comparator 1003 to compare the new EMP average k' to the present reservation factor k and, if there is a difference, to adjust up-down counter 1005 accordingly. The output from up-down counter 1005 is the reservation factor k. EMP average generator 1004 generates an exponentially mapped past average k' of TYPE 1 packets which have been transmitted in the last I packet words in accordance with:

$$k' = Wj + (1-W)k, \qquad (3)$$

where j is a value representative of the proportion of periodic packets which have been transmitted at the output port during the predetermined interval TI, i.e., the interval needed to transmit I packet words, k is the reservation factor and is a value representative of the proportion of periodic packets expected to be transmitted from the output port and W is a weighting factor having a value between zero(0) and one(1). The values of the predetermined interval TI in packet words and weighting factor W are dependent on the packet transmission rate and the desired averaging time constant, namely $\tau = TI/W$.

FIGS. 11, 12, 13, 14, and 15 when connected A—A, B—B, C—C, D—D, E—E, F—F, G—G, H—H, I—I, J—J, K—K, and L—L form a flow diagram illustrating operations performed by scheduler 113 (FIG. 1). To this end, scheduler 113 interfaces with processor 114, TBUS, TQBUS and SBUS. TBUS supplies packet transport information from input ports 104-1 through 104-(X+Y) to scheduler 113 on a synchronous basis. In this example, the synchronous timing sequence, i.e., input port polling cycle, includes N+1 time slots and has a timing rate such that each polling cycle is completed in less than a packet word interval of packets being supplied at the maximum packet transmission rate for the packet network node. It is again noted that X+Y=N and that time slot 0 is used to write certain information into units of input ports 104. The packet transport information obtained by scheduler 113 from TBUS is the packet destination(DEST), the packet destination extension (DEST EXT), the WORD COUNT for the packet, the last packet transport word OK (lpkTok), type of packet (TYPE) and starting address (SAD) in the RAM of the corresponding input port. The source (SCR), i.e., input port, of the transport information is known by the time slot of the polling cycle during which the transport information was supplied to TBUS from the corresponding input port. Processor 114 provides information as to the status of the input and output ports and the delay difference (DD) between the primary route and secondary route assigned to each for the packet destination (DEST). Port status is obtainable in well known fashion by, for example, transmitting test packets or simply observing whether or not "good" packets are being received. This information is obtained, in part, from statistics port 116. The delay differences are readily obtained by making delay measurements. The measurements may be obtained by employing so-called loop messages to measure the round trip delay on routes between packet network nodes.

Scheduler 113 also includes a so-called routing memory (RAM) which stores information regarding possible routes for the packet, i.e., primary or secondary, assigned to the packet destination. The routing RAM also includes the delay difference value between the primary and secondary routes. Also stored in the routing RAM is information indicating if the packet has previously been alternate routed, i.e., a so-called rerouted status. For certain control packets the alternate routed field is employed to indicate status of certain of the input ports. It is noted that the primary output port assigned to the packet designation may be a so-called "real" output port or a so-called "logical" output port. In this example, there are N=8 real output ports which are designated 1-8. The so-called logical so-called logical output ports are designated 0 and 9-15 and are, in this example, as follows: 0-stuff, 9-not assigned, 10-conditional source (CSRC), 11-conditional extension (CEXT), 12-destination extension (DEST EXT), 13-control (CTL), 14-not assigned and 15-stuff. Thus, if a primary output port is identified as 1-through 8 it is a "real" output port, i.e., an actual one of output ports 110 in this node to which traffic is being directed and if it is identified as, for example, 13 it is the one of output ports 110 assigned to control. The routing RAM is indexed by the DEST field of the packet to yield the stored information.

Additionally, scheduler 113 includes a so-called threshold memory unit (RAM) (not shown) which stores information regarding possible threshold values employed in determining the routes of the packets. Specifically, the threshold RAM stores threshold values for queuing delay TD, alternate routing delay TA and re-routing delay TRR. The threshold RAM is indexed by the TYPE field, as indicated above, to select predetermined threshold values TD, TA, and TRR for the particular packet. In this example, the selection of the threshold values is based on the type of packet, grade of service assigned to the packet and so-called droppability of the packet.

Accordingly, the process of scheduler 113 is entered via start oval 1101. Thereafter, operational block 1102 sets the one of input ports 104 to be polled to one (1).

Then, conditional branch point 1103 tests to determine if the status is good for the particular one of input ports 104-1 through 104-(X+Y) being polled. If the test result in step 1103 is NO, the port is not good, i.e., not functioning properly, and operational block 1104 causes the packet output information to be supplied to statistics port 116. This is achieved by operational block 1105 writing the appropriate packet output information on SBUS identifying statistics port 116 as the output port. The packet output information written on SBUS typically includes the output port address, the source of the packet (SRC), the starting address of the packet in RAM of the corresponding input port identified by SRC, the TYPE field and WORD COUNT which is the total length (M+1) of the packet. Thereafter, conditional branch point 1106 tests to determine if input port 104-(X+Y) has been polled. If the test result in step 1107 is NO, operational block 1106 causes the input port to be polled next to be set to the next one, i.e., input port=input port+1. Then, control is returned to step 1103. If the test result in step 1106 is YES, the last input port X+Y=N in the polling cycle has been serviced and operational block 1108 causes the polling sequence to wait one (1) time slot. As indicated above, this is time slot 0 in the polling cycle which is employed to write information into several units in each of input ports 104. Thereafter, control is returned to step 1102. Returning to step 1103, if the test result is YES, the input port being polled is good and conditional branch point 1109 tests to determine if the packet being serviced in the particular one of input ports 104 is a new packet. If the test result in step 1108 is NO, control is returned to step 1106 and appropriate ones of steps 1102 through 1109 are iterated until step 1109 yields a YES result. Then, operational block 1110 causes the new packet transport information to be obtained from TBUS. Again, it is noted that the routing RAM is indexed by the DEST field to yield the stored information regarding the primary and secondary routes and, hence, the primary and secondary output ports assigned to the packet destination, the delay difference between the routes and the rerouting status or if the output port is a logical output port an indication of appropriate ones of input ports 104 designated for a particular control function. Similarly, the threshold RAM is indexed by the TYPE field to yield values for thresholds TD, TA and TRR. Thereafter, conditional branch point 1111 tests to determine if the packet is good or if it is a stuff packet. If lpkTok=1, the packet is good. If the primary output port for the packet is identified as 0 or 15 from the routing RAM the packet is a stuff packet. If the test result in step 1111 is NO, the packet is either not good, i.e., lpkTok=0, or a stuff packet and operational block 1104 causes the appropriate packet output information to be supplied to statistics port 116 via step 1105 and SBUS. Thereafter, control is returned to step 1106 and appropriate ones of steps 1102 through 1111 are repeated until step 1111 yields a YES result. If the test result in step 1111 is YES, the packet is good and operational block 1112 obtains the primary and secondary routes assigned to the packet destination (DEST), the delay difference (DD) between the primary and secondary routes, threshold values TD, TA and TRR and re-routing status for the packet, i.e., whether the packet was previously alternate routed or not. It is noted that typically the primary route has less fixed transmission delay than the secondary route, however, there may be instances that the delays are substantially equal. Operational block 1113 obtains from TQBUS the queuing delay at the ones of output ports 110 assigned to the primary and secondary routes, namely, TQSUM (P) and TQSUM (S), respectively, and the interval reserved for the transmission of periodic packets, namely, RESQSUM (P) and RESQSUM (S), respectively. The status, i.e., good or bad, for the primary and secondary output ports, namely, status (P) and status (S), respectively, assigned to the packet destination is obtained from processor 114.

Figure 11:
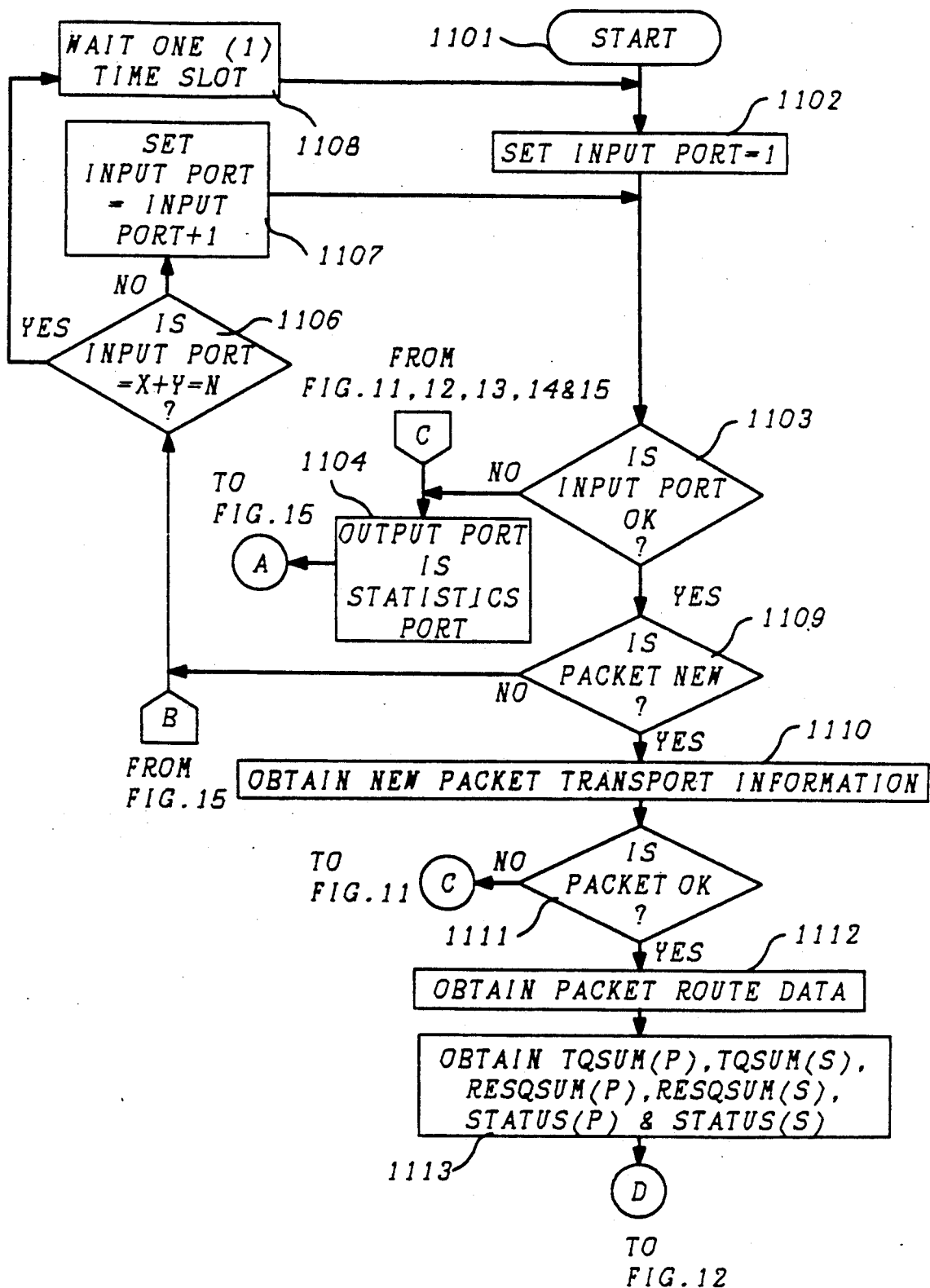
FIGS. 11, 12, 13, 14 and 15 when connected A—A, B—B, C—C, D—D, E—E, F—F, G—G, H—H, I—I, J—J, K—K and L—L form a flow diagram illustrating operations performed by scheduler 113 in packet cross-connect 103 of FIG. 1.
Figure 12:
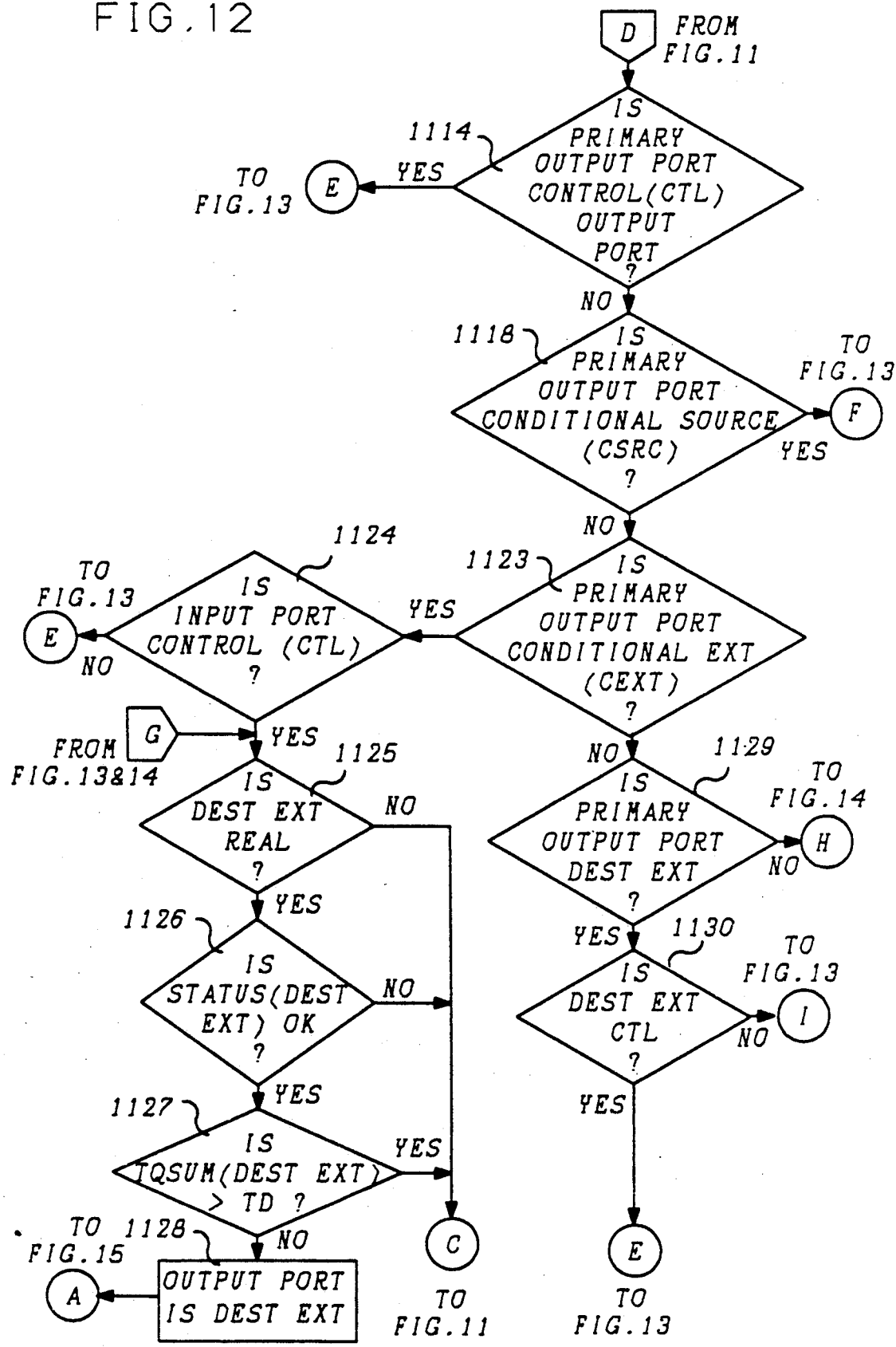
Figure 13:
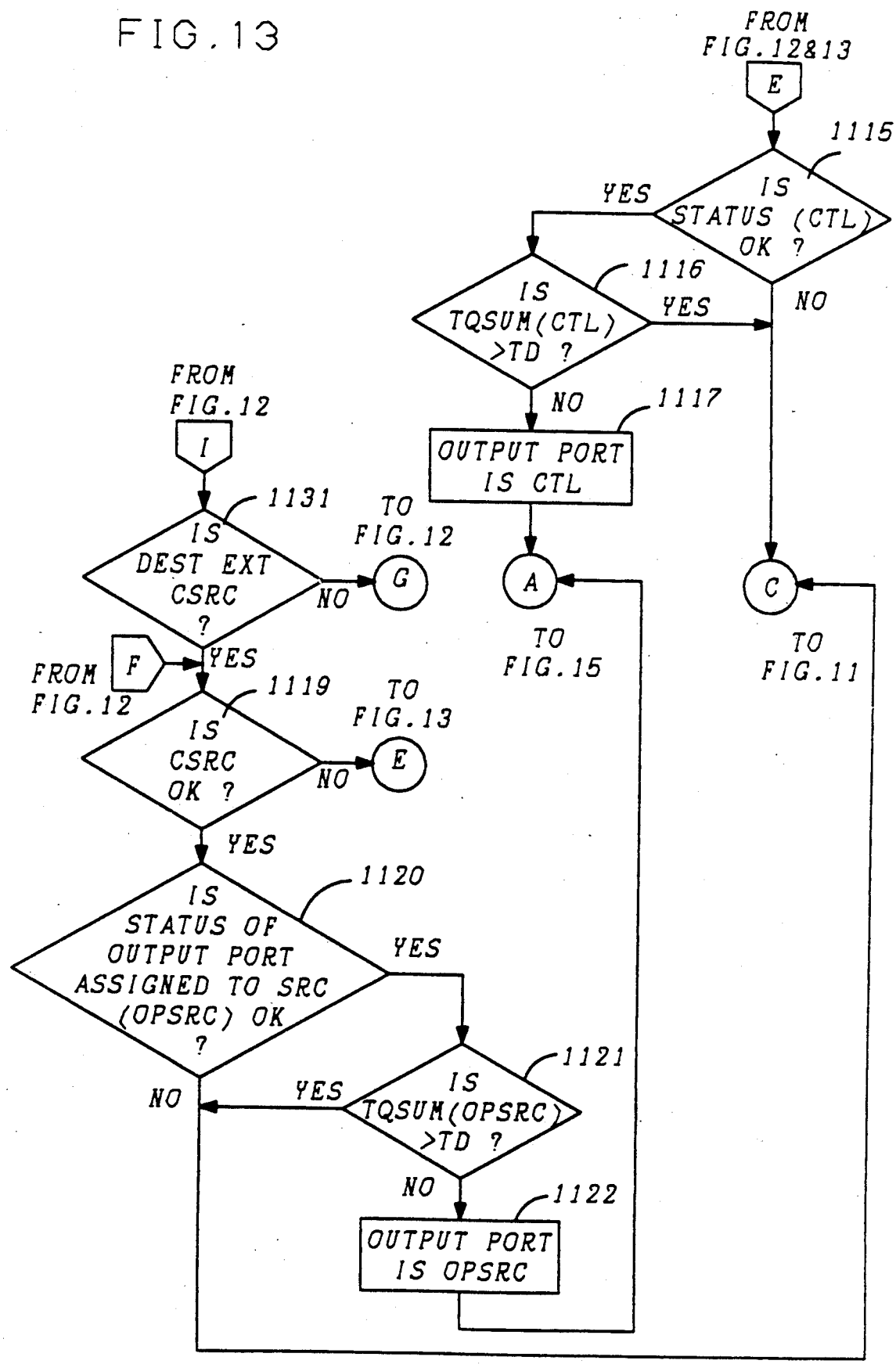
Figure 14:
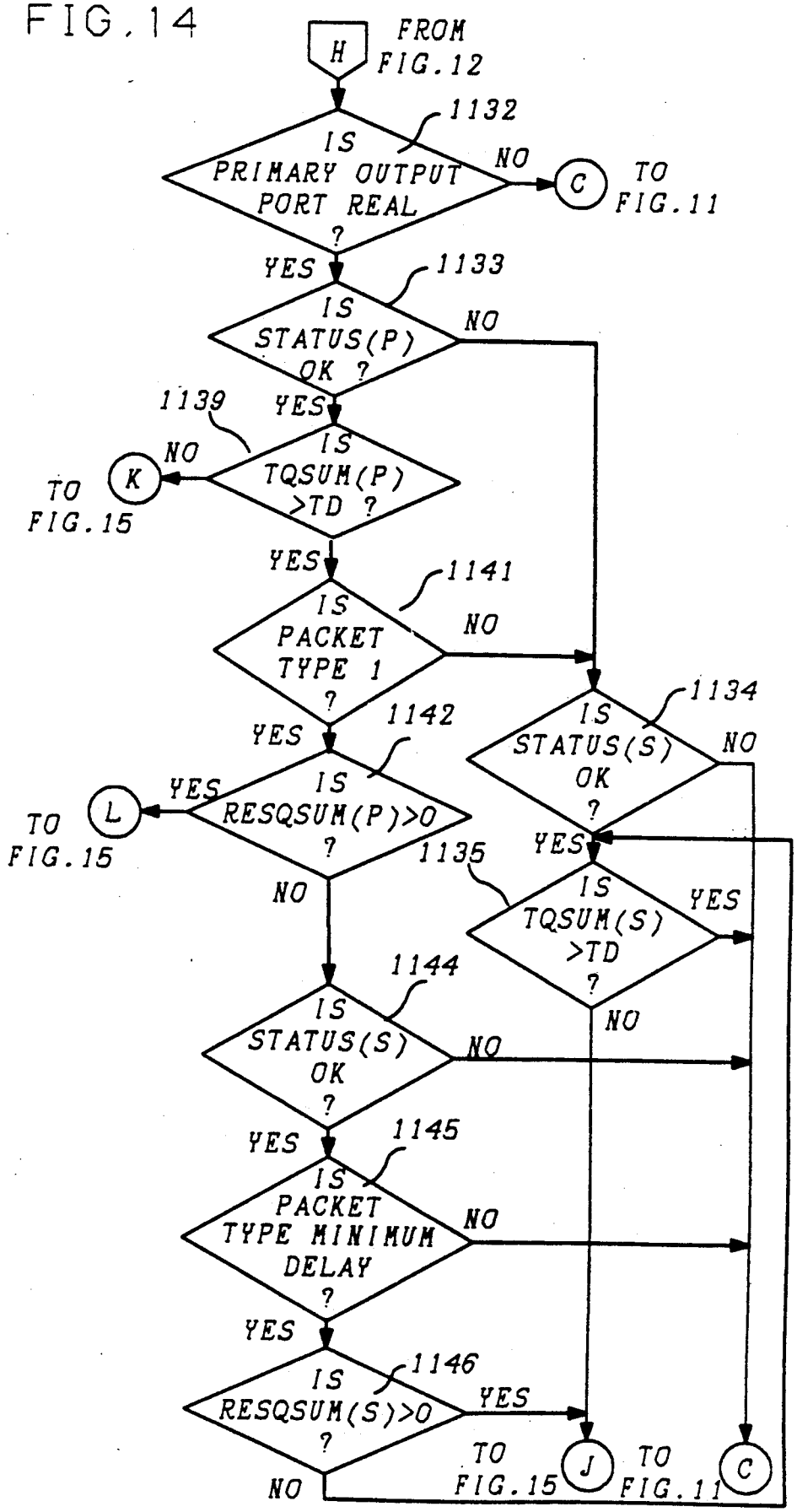

Conditional branch point 1114 tests to determine if the primary output port for the packet is the one of output ports 110 designated the control port. This is obtained from the routing RAM. Specifically, in this example, if the primary output port is designated 13, it is the designated control output port. If the test result in step 1114 is YES, conditional branch point 1115 (FIG. 13) tests to determine whether the status of the output port designated control (CTL) is good. If the test result in step 1115 is NO, control is returned to step 1104 and appropriate ones of the steps of the process are repeated until either step 1114 yields a NO result or step 1115 yields a YES result. If step 1115 yields a YES result, conditional branch point 1116 tests to determine if the queuing delay, i.e., number of packet words waiting to be transmitted, at the control output port exceeds a predetermined threshold value, namely, whether $$TQSUM(CTL) > TD, \tag{4}$$

where the value TD is set so that if the packet is going to experience more than an acceptable value of queuing delay, its transmission is terminated at statistics port 116. For example, the value of threshold TD is set such that if the packet will be overwritten in the RAM in the corresponding one of input ports 104 prior to being transmitted from the assigned output port the packet transmission is essentially terminated. Thus, if the test result in step 1116 is YES, control is returned to step 1104 and the statistics port is designated the output port. Step 1105 (FIG. 15) causes the appropriate packet output information to be written to SBUS which, in turn, supplies it to statistics port 116. Thereafter, control is returned to step 1106 (FIG. 11). If the test result in step 1116 is NO, operational block 1117 designates the output port to be the one of output ports 110 assigned to be the control (CTL) output port. Step 1105 causes appropriate packet output information to be supplied to the control output port via SBUS. Thereafter, control is returned to step 1106 and appropriate steps of the process are iterated.

Returning to step 1114 (FIG. 12), if the test result is NO, the primary output port is not control and conditional branch point 1118 tests to determine if the primary output port is identified as the output port assigned to the source (SRC) of the packet, namely, the conditional source (CSRC). This designation essentially loops the packet back to its source. To this end, conditional branch point 1119 tests to determine if the conditional source (CSRC) is intended to have this packet routed to it. This is realized by evaluating the routing status field to determine if the input port (SRC) which supplied the packet is approved for this function. If the test result in step 1119 is NO, appropriate ones of steps 1115–1117 are repeated to determine if the output port is the control output port or the statistics output port. If the test result in step 1119 is YES, conditional branch point 1120 tests to determine the status of the output port OPSRC assigned to the particular input port (SRC). If the test result in step 1120 is YES, the status (OPSRC) is good and conditional branch point tests to determine if the queuing delay at the output port (OPSRC) exceeds a predetermined threshold, namely, whether $$TQSUM(OPSRC) > TD. \qquad (5)$$

The value of and conditions set for threshold TD are essentially the same as that used in equation (4). If the test result in step 1121 is YES, the queuing delay is too long and step 1104 (FIG. 11) causes the output port to be statistics port 116. Step 1105 causes the appropriate packet output information to be written on SBUS which, in turn, supplies it to statistics port 116. The packet output information written on SBUS typically includes the output port address, the source of the packet (SRC), the starting address (SAD) of the packet in the RAM of the corresponding input port identified by SRC, the TYPE field and WORD COUNT. Upon completion of step 1105, control is returned to step 1106 (FIG. 11). If the test result in step 1121 is NO, the queuing delay at the output port assigned to OPSRC is satisfactory and operational block 1122 selects the output port to be the one assigned to the particular SRC, i.e., OPSRC. Thereafter, step 1105 writes the packet output information on SBUS which, in turn, supplies it to the output port assigned to OPSRC. It is important to note that this process involves so-called indirect addressing in order to determine which one of output ports 110 is assigned to the particular one of input ports 104 which is interfaced to the particular signal source (SRC). This is important because a remote node from which the signal may be transmitted has no information as to such output port assignments in this particular node. The use of the indirect addressing is important for achieving loop transmissions and the like to establish nearest node (neighbor) tables and the like.

Returning to step 1118 (FIG. 12), if the test result is NO, the primary output port is not CSRC and conditional branch point 1123 tests to determine if the primary output port assigned to DEST of the packet is an output port assigned to a so-called conditional extension (CEXT). This is another use of indirect addressing in which it is being determined if the packet is from CEXT, it is sent to the control output port and if the packet is from the control input, it is sent to the output port assigned to conditional extension (CEXT), i.e., to DEST EXT. Thus, if the test result in step 1123 is YES, conditional branch point 1124 tests to determine if the input port is assigned to control (CTL). If the test result in step 1124 is NO, the output port is not DEST EXT and control is returned to step 1115. Steps 1115–1117 are repeated to determine if the output port assigned to control (CTL) is good or whether the packet is to be supplied to statistics port 116, as described above. If the test result in step 1124 is YES, conditional branch point 1125 tests to determine if the output port assigned to DEST EXT is "real", i.e., one of the N (N=1–8) actual output ports in this node. If the test result in step 1125 is NO, control is returned to step 1104 (FIG. 11) and the packet is supplied to statistics port 116, as described above. If the test result in step 1125 is YES, the associated output port is DEST EXT and conditional branch point 1126 tests its status. If the test result in step 1126 is NO, the status (DEST EXT) is not good and control is returned to step 1104 (FIG. 11) and the packet is supplied to statistics port 116, as described above. If the test result in step 1126 is YES, status (DEST EXT) is good and conditional branch point 1127 tests to determine if the queuing delay at the output port assigned to DEST EXT exceeds a predetermined threshold, namely, whether $$TQSUM(DEST\ EXT) > TD. \qquad (6)$$

The same conditions apply to TD as described above regarding equation (4). If the test result in step 1127 is YES, the queuing delay is too long and control is returned to step 1104 (FIG. 11) and the packet is supplied to statistics port 116, as described above. If the test result in step 1127 is NO, the queuing delay is below the threshold TD and operational block 1128 selects the output port to be DEST EXT, as identified in bit positions VCID(16)-VCID(19) in the packet transport word. Thereafter, step 1105 (FIG. 15) writes the packet output information on SBUS which, in turn, supplies it to the appropriate output port assigned to DEST EXT. Then, control is returned to step 1106. Again, the packet output information written on SBUS typically includes the output port address, the source of the packet (SRC), the starting address (SAD) of the packet in RAM of the corresponding input port identified by SRC, the TYPE field and WORD COUNT which is total length (M+1) of the packet.

Returning to step 1123 (FIG. 12), if the test result is NO, the primary output port is not CEXT and conditional branch point 1129 tests to determine if the primary output port is DEST EXT. If the test result in step 1129 is YES, conditional branch point 1130 tests to determine if the output port assigned to DEST EXT is control (CTL). Again, this is another example of indirect addressing. If the test result in step 1130 is YES, the output port is assigned to control and the process returns to step 1115. Appropriate ones of steps 1115–1117 are repeated, as described above, to determine if the packet is supplied to either the control output port or statistics port 116. Returning to step 1130, if the test result is NO, the output port assigned to DEST EXT is not control and conditional branch point 1131 (FIG. 13) tests to determine if the output port assigned to DEST EXT is assigned to conditional source (CSRC). Again, this is another example of indirect addressing which is used to locate appropriate output ports in this node for packets transmitted from a remote node that does not know the port assignments in this node. If the test result in step 1131 is NO, the output port assigned to DEST EXT is not CSRC, control is returned to step 1125 and appropriate ones of steps 1125–1128 are repeated to determine if the packet is to be supplied to the output port assigned to DEST EXT or to statistics port 116, as described above. If the test result in step 1131 is YES, appropriate ones of steps 1119–1122 and 1115–1117 are repeated to determine if the packet is to be supplied to the output port assigned to the conditional source, i.e., OPSRC, to the control (CTL) output port or to statistics port 116, as described above.

Returning to step 1129, if the test result is NO, the primary output port is not DEST EXT and conditional branch point 1132 (FIG. 14) tests to determine if the primary output port is "real", i.e., one of the N (N=1–8) actual output ports in this node. If the test result in step 1132 is NO, control is returned to step 1104 and the packet is supplied to statistics port 116, as described above. If the test result in step 1132 is YES, the primary output port is real and conditional branch port 1133 tests the status of the one of output ports 110 assigned to the primary route, i.e., status (P). If the primary output port status is not good, the test result in step 1133 is NO and conditional branch point 1134 tests the status of the output port assigned to the secondary route, i.e., status (S). If the test result in step 1134 is NO, control is returned to step 1104 (FIG. 11) and the packet is supplied to statistics port 116, as described above. If the test result in step 1134 is YES, conditional branch point 1135 tests to determine if the queuing delay, i.e., number of packet words to be transmitted from the secondary output port, exceeds a predetermined delay threshold TD, namely, whether $$TQSUM(S) > TD. \quad (7)$$

Again, the value of TD is set so that if the packet is going to experience more than an acceptable amount of delay in being transmitted, its transmission is terminated at statistics port 116. For example, the value of delay threshold TD is set such that, if the packet will be overwritten in the RAM in the corresponding one of input ports 104 prior to being transmitted from the output port its transmission is terminated. Consequently, delay threshold TD has a relatively high value. Thus, if the test result in step 1134 is YES, control is returned to step 1104 (FIG. 11) and the packet is supplied to statistics port 116, as described above. If the test result in step 1135 is NO, the delay is acceptable and conditional branch point 1136 tests to determine if the packet has been previously alternate routed. This is readily determined from the destination of the packet (DEST), which input port (SRC) that the packet was received on and the known system topology. Again, it is important to not alternate route and, if necessary, to terminate transmission of packets that have been previously alternate routed if they will experience too long a delay in transmission. Termination of transmission of such packets minimizes the likelihood that the so-called "funeral effect" can result. As is known, the "funeral effect" causes throughput in the system to become increasingly less as the load on the system increases. Therefore, terminating transmission of packets that have been previously alternate routed when the delay in the secondary output port exceeds a predetermined minimum acceptable re-routing threshold TRR increases overall system "good" throughput. Thus, if the test result in step 1136 is NO, the packet has not been previously alternate routed and step 1137 selects the secondary output port to transmit the packet. Step 1105 writes the packet output information to SBUS and, then, control is returned to step 1106 (FIG. 11). If the test result in step 1136 is YES, the packet has been previously alternate routed and conditional branch point 1138 tests to determine if the queuing delay TQSUM(S) at the secondary output port is greater than the predetermined re-routing threshold TRR, namely, whether $$TQSUM(S) > TRR \quad (8)$$

It is noted that threshold TRR represents some minimal transmission delay interval at the secondary output port so that if the packet were supplied to the secondary output port it would experience only a minimal delay before being transmitted. Thus, if the test result in step 1138 is YES, the delay is too long, control is returned to step 1104 (FIG. 11) and the packet is supplied to statistics port 116, as described above. If the test result in step 1138 is NO, the delay is acceptable and step 1137 selects the secondary output port for transmitting the packet. Thereafter, step 1105 causes the packet output information to be written on SBUS and, then, control is returned to step 1106 (FIG. 11).

Returning to step 1133 (FIG. 14), if the primary output port status (P) is good, a YES result is obtained and conditional branch point 1139 tests to determine whether the queuing delay at the primary output port exceeds the delay threshold TD, namely, whether $$TQSUM(P) > TD. \quad (9)$$

Figure 15:
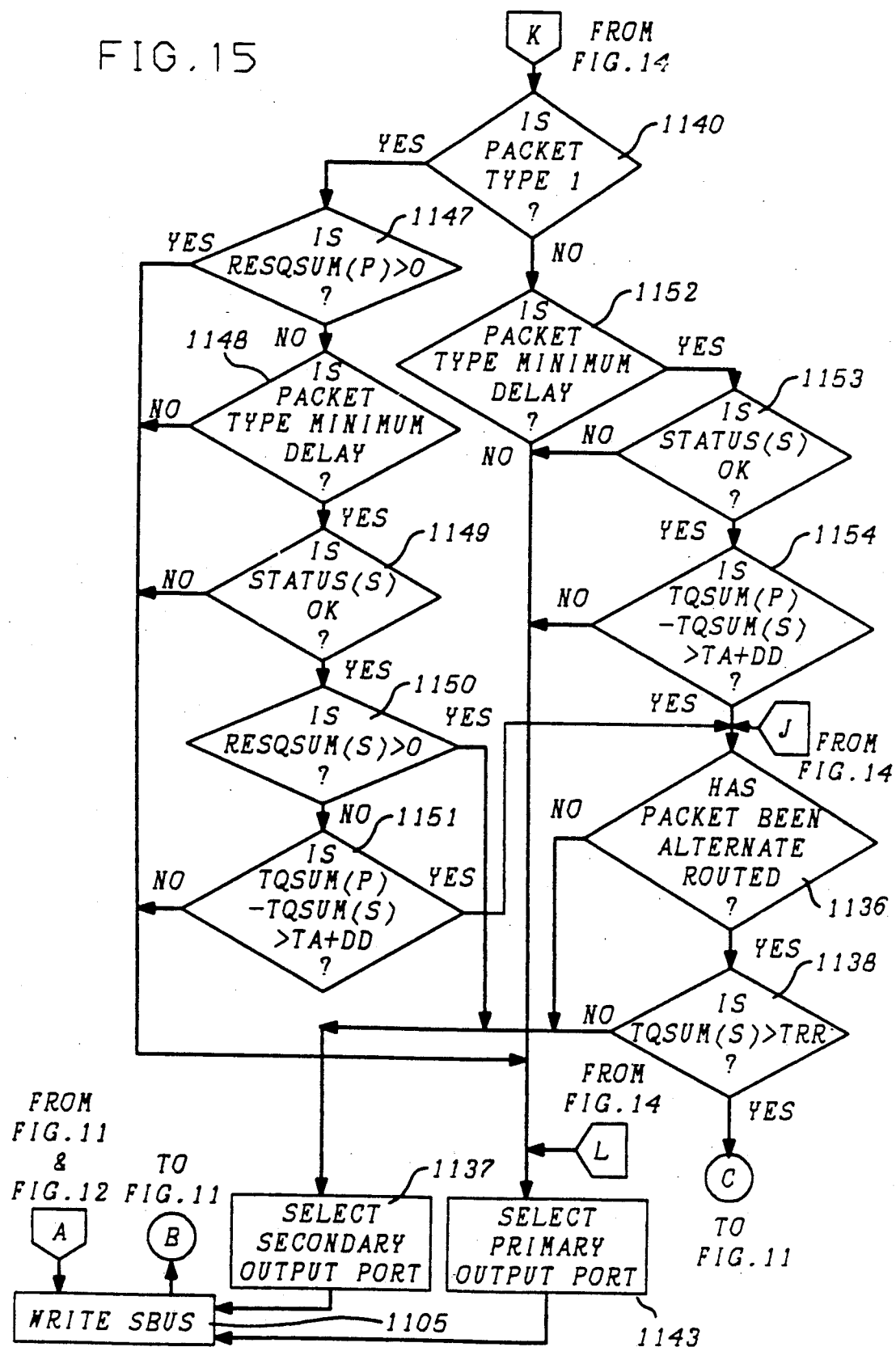

Again, the conditions regarding TD are as described above. If the test result in step 1139 is YES, control is transferred to conditional branch point 1141. If the test result in step 1139 is NO, control is transferred to conditional branch point 1140 (FIG. 15).

Conditional branch point 1141 (FIG. 14) tests to determine whether the packet is a so-called type 1, i.e., periodic packet. This is achieved by determining if bit position TYPE (1) includes a logical 1. If so, this packet is periodic. This test is important because it is not desirable to terminate transmission of periodic packets. If the test result in step 1141 is NO, the packet is statistical and appropriate ones of steps 1134-1138 and 1104 are performed, as described above. If the test result in step 1141 is YES, the packet is periodical and conditional branch point 1142 tests to determine if the primary output port assigned to the packet DEST has a reserved interval for the transmission of periodic packets, namely, whether $$RESQSUM(P) > 0. \quad (10)$$

If the test result in step 1142 is YES, operational block 1143 (FIG. 15) selects the primary output port to transmit the packet. Thereafter, operational block 1105 causes the packet output information, as described above, to be written on the SBUS and, then, control is returned to step 1106 (FIG. 11).

If the test result in step 1142 is NO, conditional branch point 1144 tests the status of the secondary output port assigned to the packet DEST, namely, status(s). If the test result in step 1144 is NO, the status (S) is not good, control is returned to step 1104 (FIG. 11) and the packet is supplied to statistics port 116, as described above. If the test result in step 1144 is YES, the status (S) is good and conditional branch point 1145 tests to determine if the packet is a minimum delay type. This test is achieved by interrogating bit position TYPE (4) to determine whether or not it is a logical 1. A logical 1 indicates that the packet has a minimum delay class of service assigned to it. It is noted that both periodic and statistical packets can be assigned a class of service requiring minimum delay. If the test result in step 1145 is NO, the packet (FIG. 11) is not a minimum delay type, control is returned to step 1104, and the packet is supplied to statistics port 116, as described above. If the test result in step 1145 is YES, the packet is a minimum delay type and conditional branch point 1146 tests to determine if the secondary output port assigned to the packet DEST has a reserved interval for the transmission of periodic packets, namely, whether $$RESQSUM(S) > 0. \quad (11)$$

If the test result in step 1146 is YES, there is an interval reserved for transmitting periodic packets, control is returned to step 1136 (FIG. 15) and appropriate ones of steps 1136–1138 (FIG. 19) and 1104 (FIG. 11) are repeated to determine if the secondary output port is to be selected to transmit the packet or whether the packet is supplied to statistics port 116, as described above. In turn, step 1105 causes the packet output information, as described above, to be written on the SBUS. Thereafter, control is returned to step 1106 (FIG. 11). If the test result in step 1146 is NO, there is no interval reserved for transmitting periodic packets, control is returned to step 1135 and appropriate ones of steps 1135–1138 and 1104 are repeated to determine whether the secondary output port is selected to transmit the packet or whether the packet is supplied to statistics port 116, as described above. In turn, step 1105 causes the packet output information to be written on SBUS. Then, control is returned to step 1106 (FIG. 11).

Conditional branch point 1140 (FIG. 15) also tests to determine if the packet is a type 1, i.e., periodic packet, as described above. If the test result in step 1140 is YES, the packet is periodic and conditional branch point 1147 tests to determine if the primary output port assigned to the packet DEST has a reserved interval for the transmission of periodic packets, in accordance with equation (10). If the test result in step 1147 is YES, step 1143 selects the assigned primary output port to transmit the packet, step 1105 writes the packet output information to SBUS, as described above, and control is returned to step 1106 (FIG. 11). If the test result in step 1147 is NO, conditional branch point 1148 tests to determine if the packet is a minimum delay type, as described above. If the test result in step 1148 is NO, steps 1143 and 1105 are effected, as described above, and control is returned to step 1106 (FIG. 11). If the test result in step 1148 is YES, conditional branch point 1149 tests the status of the secondary output port assigned to the packet DEST, namely, status (S). If the test result in step 1149 is NO, steps 1143 and 1105 are effected, as described above, and control is returned to step 1106 (FIG. 11). If the test result in step 1149 is YES, conditional branch point 1150 tests to determine if the secondary output port assigned to the packet DEST has a reserved interval for the transmission of periodic packets in accordance with equation (11). If the test result in step 1150 is YES, step 1137 selects the secondary output port to transmit the packet, step 1105 writes the packet output information to SBUS and control is returned to step 1106 (FIG. 11). This follows because the secondary output port will have the least delay in transmitting the packet. If the test result in step 1150 is NO, conditional branch point 1151 tests to determine which one of the primary and secondary output ports has less delay, in accordance with an aspect of the invention, by comparing the actual queuing delay, i.e., amount of packet information to be transmitted, at each of the primary and secondary output ports relative to a predetermined threshold TA and the delay difference DD between the primary and secondary routes assigned to the packet DEST. The relationship is whether $$\text{TQSUM (P)} - \text{TQSUM (S)} > \text{TA} + \text{DD}. \quad (12)$$

The value of threshold TA is selected to be a value significantly lower than the delay threshold TD and such that the packet is not unnecessarily routed to the secondary route. This minimizes the possiblity of the so-called "funeral effect" resulting. Again, the "funeral effect" is a condition that results in lower and lower network throughput because of packets being alternate routed. Consequently, as network loading increases system "good" throughput decreases. If the test result in step 1151 is NO, the primary output port has the least delay, step 1143 selects the primary output port to transmit the packet, step 1105 writes the packet output information to SBUS and control is returned to step 1106 (FIG. 11). If the test result in step 1151 is YES, the secondary output port has the least delay, control is returned to step 1136 and appropriate ones of steps 1136–1138 and 1104 are repeated to determine whether the secondary output port is selected to transmit the packet or whether the packet is to be supplied to statistics port 116, as described above. Thereafter, control is returned to step 1106 (FIG. 11).

Returning to step 1140, if the test result is NO, the packet is statistical and conditional branch point 1152 tests to determine if the packet is a minimum delay type, in a manner as described above. If the test result in step 1152 is NO, the packet is not a minimum delay type. Step 1143 selects the primary output port to transmit the packet. Thereafter, step 1105 writes the packet output information to SBUS and control is again returned to step 1106 (FIG. 11). If the test result in step 1152 is YES, the statistical packet has been assigned a minimum delay grade of service and conditional branch point 1153 tests the secondary output port status, i.e., status (S). If the test result in step 1153 is NO, the status (S) is not good and step 1143 selects the primary output port to transmit the packet. This follows because the secondary output port is not available and, hence, the primary route will have the least delay. Again, step 1105 writes the packet output information to SBUS and, thereafter, control is returned to step 1106. If the test result in step 1153 is YES, conditional branch point 1154 tests to determine which one of the primary and secondary output ports has less delay in accordance with equation (12), described above. If the test result in step 1154 is NO, the primary output port has less delay and step 1143 selects it to transmit the packet. Again, step 1105 writes the packet output information to SBUS and, thereafter, control is returned to step 1106. If the test result in step 1154 is YES, the secondary output port has less delay, control is transferred to step 1136 and appropriate ones of steps 1136–1138 and 1104 are repeated to determine whether the secondary output port is selected to transmit the packet or whether the packet is to be supplied to statistics port 116, as described above. Thereafter, step 1105 writes the packet output information to SBUS and control is then returned to step 1106.

OUTPUT LOCAL PACKET INTERFACE

Output local packet interfaces 112-1 through 112-Y (FIG. 1) are employed to interface output ports 110-(X+1) through 110-(X+Y), respectively, to particular apparatus and/or communications links as desired via output terminals 115-(X+1) through 115-(X+Y), respectively. As indicated above, the apparatus and/or communications links being interfaced, correspond to those interfaced by input local packet interfaces 106 in packetizers 105-1 through 105-Y. This follows because there is a need for two way communication between the apparatus and/or communication links being interfaced. To this end, each of output ports 110-(X+1) through 110-(X+Y) supplies the packet information a byte at a time along with a start of packet (SOP) signal and a STUFF signal to an associated one of output local packet interfaces 112. Each of output local packet interfaces 112 supplies an ENABLE OUT signal to its associated one of output ports 110. The ENABLE OUT signal is at a packet byte rate and indicates to the associated output port that the output local packet interface is ready to receive a packet byte. Each of output local packet interfaces 112 includes apparatus for depacketizing the supplied packets and for supplying the depacketized information in an appropriate signal format for the apparatus and/or communications link being interfaced. The SOP signal indicates the beginning of the packet so that it can be properly depacketized. The STUFF signal indicates whether the packet could be ignored. Apparatus to be included in individual ones of output local packet interfaces 112 will depend on the particular apparatus or communication link being interfaced and will be apparent to those skilled in the art.

NETWORK

FIG. 16 depicts a network, in simplified form, which advantageously utilizes aspects of the invention. It is noted that there is two way communication between elements forming the network. Accordingly, shown are private networks 1601 and 1602, so-called local networks 1603 and 1604 and higher layer network 1605. Although only two layers in the public system hierarchy are shown, it will be apparent to those skilled in the art that any number of layers may be employed as needed or desired in the overall network. Each of private networks 1601 and 1602 may include a number of switching and access packet network nodes including aspects of the invention. For example, private networks 1601 and 1602 may be those of a particular transport network user and be located at diverse geographic locations. The broadband packets generated in the private networks are identical to those described in relation to packet network node 100 and employed in networks used in the public system. A particular private network is assigned a unique reference code word Xref in order to identify its packets and to provide transparency for all other information being transmitted. The broadband packets supplied to and from private network 1601 and another apparatus and/or communication links are supplied to an access packet network node (AN) 1606. In turn, access node 1606 supplies packets to and receives packets from a switching packet network node (SN) in local network 1603. As indicated above, the packets from private network 1601 and signals from other interfacing apparatus appear as information and are formatted into broadband packets by a packetizer in access node 1606. These broadband packets are generated using a unique reference code word Xref assigned to local network 1603. The packets in local network 1603 may traverse several switching nodes (SN) or be supplied to some other apparatus, network or transmission facility interfacing local network 1603 via access node 1606 or some other access node (not shown). If the packets are destined for some other local network, for example, network 1604, they will be supplied via gateway node 1607 to higher layer network 1605 and, therein, to a switching node (SN). In gateway node 1607, a new transport word is appended to each packet which has been generated using a unique reference code word assigned to higher layer network 1605. This appending can be achieved by simply adding another transport word to the packets or by stripping off the previous transport word and adding a new one generated in gateway node 1607. Similarly, if packets are being supplied from higher layer network 1605 to local network 1603, gateway node 1607 would strip the higher layer network transport word which had been added or if the transport word was replaced dropping the higher layer network transport word and adding a transport word generated with the reference code word Xref assigned to local network 1603. If the packets being transmitted in higher layer network 1605 are destined for local network 1604, they are supplied thereto via gateway node 1608. Gateway node 1608 performs the same functions as gateway node 1607. In local network 1604, the packets are supplied via one or more switching nodes to access node 1609. Access node 1609 supplies the packets to a specific apparatus, transmission facility or private network 1602. Again, the packets destined for private network 1602 include transport words generated by using a unique reference code word Xref assigned to the private network transport user. Consequently, the packets will be recognized in private network 1602. Therefore, it is seen that the private network packets can be readily identified by use of the unique reference code word and still transmit the private network packets on a transparent basis through the broadband packet network hierachy.

I claim:

1. Apparatus for generating a packet including at least a transport word, i.e., header, comprising:

means for generating said transport word including a predetermined number of groups of bit positions each including a predetermined number of said bit positions, predetermined ones of said transport word bit positions forming an at least one prescribed parity check field;

a source of a reference code word having a number of bits, said reference code word being independent from any information in the transport word;

means for generating an at least first prescribed parity check from bits in a number of predetermined bit positions of said transport word and predetermined ones of said number of bits of said reference code word; and means for inserting a number of bits representative of said at least first prescribed parity check into a corresponding number of bit positions forming said at least first prescribed parity check field in said transport word.

2. The apparatus as defined in claim 1 wherein said means for generating said at least first prescribed parity check generates a predetermined number of parity check bits forming said at least first parity check by computing parity form said bits in a number of predetermined bit positions of said transport word and wherein each of predetermined ones of said number of reference code word bits defines the sense, i.e., odd or even, of parity being computed to generate a corresponding one of said predetermined number of parity check bits forming said first prescribed parity check.

3. The apparatus as defined in claim 2 wherein said means for generating said at least first prescribed parity check includes means for generating said predetermined number of parity check bits forming said at least first prescribed parity check by computing parity to yield individual ones of said parity check bits from bits in predetermined bit positions in one or more of predetermined ones of said groups of bit positions in said transport word in conjunction with said predetermined ones of said reference code word bits.

4. The apparatus as defined in claim 2 wherein said means for generating said at least first prescribed parity check includes means for generating said predetermined number of parity check bits forming said at least first prescribed parity check by computing parity from bits in predetermined similar bit positions in predetermined ones of said groups of bit positions in said transport word in conjunction with said predetermined ones of said reference code word bits.

5. The apparatus as defined in claim 2 wherein a predetermined number of said transport word bit positions form an at least second prescribed parity check field, and further including means for generating an at least second prescribed parity check from bits in predetermined bit positions of said transport word and means for inserting a number of bits representative of said at least second prescribed parity check in said number of bit positions of said at least second parity check field in said transport word.

6. The apparatus as defined in claim 5 wherein predetermined ones of said reference code word bits are supplied to said means for generating said at least second prescribed parity check, wherein said means for generating said at least second prescribed parity check generates a predetermined number of parity check bits forming said at least second prescribed parity check and wherein each of said supplied predetermined ones of said reference code word bits defines the sense, i.e., odd or even, of parity being computed to generate a corresponding one of said predetermined number of parity check bits forming said at least second prescribed parity check.

7. The apparatus as defined in claim 6 wherein said means for generating said at least second prescribed parity check includes means for generating said predetermined number of parity check bits forming said at least second prescribed parity check by computing parity from bits in predetermined similar bit positions in predetermined ones of said groups of bit positions in said transport word in conjunction with said supplied predetermined ones of said reference code word bits.

8. The apparatus as defined in claim 7 wherein said means for generating said at least first prescribed parity check includes means for generating said predetermined number of parity check bits forming said at least first prescribed parity check by computing individual ones of said parity check bits from bits in predetermined bit positions in one or more of predetermined ones of said groups of bit positions in said transport word in conjunction with said predetermined ones of said reference code word bits.

9. The apparatus as defined in claim 8 wherein predetermined ones of said predetermined similar bit positions in said predetermined ones of said groups of bit positions include said parity check bits which form said at least first prescribed parity check.

10. The apparatus as defined in claim 2 wherein each of said predetermined number of groups of bit positions forms a byte, wherein said means for generating said transport word generates each said byte in parallel and wherein said transport word bit positions form a predetermined number of columns of bit positions and a predetermined number of rows of bit positions.

11. The apparatus as defined in claim 10 wherein said means for generating said at least first prescribed parity check includes means for generating said predetermined number of parity check bits forming said at least first prescribed parity check by computing parity from bits in predetermined bit positions of one or more of predetermined ones of said columns of bit positions in said transport word in conjunction with said predetermined ones of said reference code word bits.

12. The apparatus as defined in claim 11 wherein a predetermined number of said transport word bit positions form an at least second prescribed parity check field, and further including means for generating an at least second prescribed parity check from bits in predetermined bit positions of said transport word and means for inserting a number of bits representative of said at least second prescribed parity check in said number of bit positions of said at least second parity check field in said transport word.

13. The apparatus as defined in claim 12 wherein predetermined ones of said reference code word bits are supplied to said means for generating said at least second prescribed parity check, wherein said means for generating said at least second prescribed parity check generates a predetermined number of parity check bits forming said at least second prescribed parity check and wherein each of said supplied predetermined ones of said reference code word bits defines the sense, i.e., odd or even, of parity being computed to generate a corresponding one of said predetermined number of parity check bits forming said at least second prescribed parity check.

14. The apparatus as defined in claim 13 wherein said means for generating said at least second prescribed parity check includes means for generating said predetermined number of parity check bits forming said at least second prescribed parity check by computing parity from bits in predetermined ones of bit positions of each of a corresponding number of predetermined ones of said rows of bit positions in said transport word in conjunction with said supplied predetermined ones of said reference code word bits.

15. The apparatus as defined in claim 14 wherein said means for generating said transport word generates said transport word to include eight bytes and each byte includes eight bit positions, wherein said means for generating said at least first prescribed parity check generates individual parity check bits by computing parity from bits in the eight bit positions of at least six of said bytes, wherein said means for generating said at least second prescribed parity check generates individual parity check bits by computing parity from bits in each row of bit positions from seven of said bytes and wherein said number of reference code word bits is at least twelve, eight of which are associated on a one-to-one basis with said rows of bit positions and four of which are associated on a one-to-one basis with predetermined ones of said columns of bit positions.

16. The apparatus as defined in claim 1 wherein said reference code word is unique to a particular transport network configuration.

17. The apparatus as defined in claim 1 further including means for interfacing to a transmission facility supplying information to be formatted into said packet.

18. The apparatus as defined in claim 1 further including means for interfacing to a transmission facility to transmit said packet to a remote location.

19. The apparatus as defined in claim 1 further including means for interfacing to apparatus supplying information to be formatted into said packet.

20. The apparatus as defined in claim 19 further including means for interfacing to a packet network node.

21. The apparatus as defined in claim 20 further including means for interfacing to a packet cross-connect switch.

22. Apparatus for generating a packet including at least a transport word, i.e., header, comprising:
  means for generating said transport word including a predetermined number of groups of bit positions each including a predetermined number of bit positions, predetermined ones of said transport word bit positions forming a plurality of parity check fields;
  a source of a reference code word having a number of bits, said reference code word being independent from any information in the transport word;
  means for generating a plurality of prescribed parity checks from bits in predetermined bit positions of said transport word in conjunction with said number of bits of said reference code word, wherein each of said bits from said predetermined bit positions in said transport word is used to compute at least two different parity check bits which form said plurality of prescribed parity checks; and
  means for inserting said computed parity check bits into bit positions in said plurality of parity check fields in said transport word.

23. The apparatus as defined in claim 22 wherein said means for generating said plurality of prescribed parity checks includes means for using said number of reference code word bits to determine the sense, i.e., odd or even, of parity being computed to realize predetermined ones of said parity check bits being computed.

24. The apparatus as defined in claim 23 wherein said reference code word is unique to a particular transport network configuration.

25. The apparatus as defined in claim 24 further including means for interfacing to a transmission facility supplying information to be formatted into said packet.

* * * * *

UNITED STATES PATENT AND TRADEMARK OFFICE
CERTIFICATE OF CORRECTION

PATENT NO.   :   5,020,054
DATED        :   May 28, 1991
INVENTOR(S)  :   Carl J. May, Jr.

It is certified that error appears in the above-identified patent and that said Letters Patent is hereby corrected as shown below:

Title Page:
Assignee:  Presently blank, please insert --AT&T Bell Laboratories
                                             Murray Hill, N.J.--

Attorney, Agent or Firm:  Presently blank, please insert
                          --Thomas Stafford--

Column 32, line 49, "form" should read --from--.

Signed and Sealed this

Thirteenth Day of April, 1993

Attest:

STEPHEN G. KUNIN

*Attesting Officer*      *Acting Commissioner of Patents and Trademarks*